(12) United States Patent
Wu et al.

(10) Patent No.: US 12,470,451 B2
(45) Date of Patent: Nov. 11, 2025

(54) CONSTELLATION SHAPING-RELATED CODING SELECTION

(71) Applicant: QUALCOMM Incorporated, San Diego, CA (US)

(72) Inventors: Liangming Wu, Beijing (CN); Changlong Xu, Beijing (CN); Kangqi Liu, San Diego, CA (US); Jian Li, Shanghai (CN); Ruiming Zheng, Beijing (CN); Hao Xu, Beijing (CN); Ori Shental, Marlboro, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 128 days.

(21) Appl. No.: 18/256,724

(22) PCT Filed: Mar. 5, 2021

(86) PCT No.: PCT/CN2021/079254
§ 371 (c)(1),
(2) Date: Jun. 9, 2023

(87) PCT Pub. No.: WO2022/183472
PCT Pub. Date: Sep. 9, 2022

(65) Prior Publication Data
US 2024/0048430 A1 Feb. 8, 2024

(51) Int. Cl.
*H04L 27/34* (2006.01)
*H04L 1/00* (2006.01)

(52) U.S. Cl.
CPC ........ *H04L 27/3405* (2013.01); *H04L 1/0042* (2013.01); *H04L 1/0068* (2013.01)

(58) Field of Classification Search
CPC . H04L 27/3405; H04L 1/0042; H04L 1/0068; H04L 1/0056; H04L 1/0058; H04L 27/22; H04L 27/20
See application file for complete search history.

(56) References Cited

U.S. PATENT DOCUMENTS 10,069,519 B1 * 9/2018 Millar .................. H04L 1/0042
10,091,046 B1 * 10/2018 Lefevre .................. H04L 27/36
(Continued)

FOREIGN PATENT DOCUMENTS

BR  102021025329 A2 * 6/2023
CA      3128897 A1 * 9/2020 .......... H04J 14/0298
(Continued)

OTHER PUBLICATIONS

International Search Report and Written Opinion—PCT/CN2021/079254—ISA/EPO—Dec. 7, 2021 9 pp.
(Continued)

*Primary Examiner* — Berhanu Tadese
(74) *Attorney, Agent, or Firm* — Shumaker & Sieffert, P.A.

(57) ABSTRACT

Aspects of the disclosure relate to wireless communication utilizing a modulation and coding scheme that selectively or dynamically applies probabilistically-shaped coding (PCS) to modulate a transmitted waveform. A communication device may determine whether to apply PCS. If PCS is to be applied, the device can encode the message based on a systematic code; and if PCS is not to be applied, the device can encode the message based on a non-systematic code. Other aspects, embodiments, and features are also claimed and described.

22 Claims, 15 Drawing Sheets

(56) References Cited

U.S. PATENT DOCUMENTS

| | | | |
|---|---|---|---|
| 10,200,231 B1* | 2/2019 | Lefevre | H04L 27/3411 |
| 10,396,899 B1* | 8/2019 | Kim | H04B 10/541 |
| 10,530,490 B1* | 1/2020 | Vassilieva | H04B 10/5161 |
| 10,587,358 B1* | 3/2020 | Ebrahimzad | H04B 10/541 |
| 10,601,629 B2* | 3/2020 | Krishnan | H04L 27/0008 |
| 10,700,807 B1* | 6/2020 | Vassilieva | H04J 14/02218 |
| 10,778,326 B1* | 9/2020 | Mukhopadhyay | H04L 1/0061 |
| 10,848,269 B2* | 11/2020 | Ebrahimzad | H04L 1/0041 |
| 11,070,410 B1* | 7/2021 | Ait Aoudia | G06N 3/04 |
| 11,121,903 B2* | 9/2021 | Torbatian | H04L 27/362 |
| 11,811,580 B2* | 11/2023 | Yi | H04L 27/3405 |
| 11,831,431 B2* | 11/2023 | Ebrahimzad | H04L 27/34 |
| 11,838,123 B2* | 12/2023 | Ebrahimzad | H04L 1/0041 |
| 12,057,863 B2* | 8/2024 | Nakamura | H04L 27/34 |
| 12,057,983 B2* | 8/2024 | Koike-Akino | H04L 27/2617 |
| 12,191,993 B2* | 1/2025 | Liu | H04L 1/0057 |
| 2011/0007834 A1 | 1/2011 | Hoshino | H04W 28/12 375/285 |
| 2018/0083716 A1* | 3/2018 | Cho | H04B 14/002 |
| 2018/0375616 A1* | 12/2018 | Beale | H04L 1/08 |
| 2019/0052511 A1* | 2/2019 | Gultekin | H04L 1/0068 |
| 2019/0149387 A1* | 5/2019 | Torbatian | H04J 14/0205 375/298 |
| 2019/0149388 A1* | 5/2019 | Torbatian | H04B 10/0779 375/298 |
| 2019/0149389 A1* | 5/2019 | Torbatian | H04B 10/541 375/298 |
| 2019/0149390 A1* | 5/2019 | Torbatian | H04L 27/362 375/298 |
| 2019/0379485 A1* | 12/2019 | Jiang | H03M 13/2742 |
| 2020/0177307 A1* | 6/2020 | Pan | H04L 1/0045 |
| 2020/0228386 A1* | 7/2020 | Jardel | H04L 25/0212 |
| 2021/0194596 A1* | 6/2021 | Kim | H04B 10/6932 |
| 2023/0091550 A1* | 3/2023 | Nakamura | H03M 7/60 341/107 |
| 2023/0208526 A1* | 6/2023 | Yoshida | H04L 1/0047 398/183 |
| 2024/0048430 A1* | 2/2024 | Wu | H04L 1/0042 |
| 2024/0121035 A1* | 4/2024 | Xiao | H04L 1/0042 |
| 2025/0062946 A1* | 2/2025 | Li | H04L 27/3411 |

FOREIGN PATENT DOCUMENTS

| | | | | |
|---|---|---|---|---|
| CA | 3128897 C | * | 9/2022 | H04L 27/34 |
| CN | 103378921 A | * | 10/2013 | H04L 1/0054 |
| CN | 108809375 A | * | 11/2018 | H04L 1/0061 |
| CN | 108989253 A | | 12/2018 | |
| CN | 109547385 A | * | 3/2019 | H04L 27/3818 |
| CN | 110959262 A | * | 4/2020 | H04L 27/3411 |
| CN | 111628789 A | * | 9/2020 | H03M 13/2954 |
| CN | 111869137 A | * | 10/2020 | H04J 14/0298 |
| CN | 108989253 B | * | 11/2020 | H04L 27/0008 |
| CN | 116897525 A | * | 10/2023 | H04L 1/0058 |
| EP | 3635893 A1 | * | 4/2020 | H04L 1/0042 |
| EP | 3635893 A4 | * | 7/2020 | H04L 1/0042 |
| EP | 3706379 A1 | * | 9/2020 | H04L 27/36 |
| EP | 3759843 A1 | * | 1/2021 | H04B 10/40 |
| EP | 3864812 A2 | * | 8/2021 | H03M 13/11 |
| EP | 3759843 B1 | * | 2/2022 | H04J 14/0298 |
| EP | 4075693 A1 | * | 10/2022 | H04L 1/0042 |
| EP | 3635893 B1 | * | 5/2023 | H04L 27/0008 |
| EP | 3864812 B1 | * | 8/2023 | H04L 27/34 |
| EP | 4246906 A2 | * | 9/2023 | H04L 27/34 |
| EP | 4075693 B1 | * | 5/2024 | H04L 1/004 |
| EP | 4221116 B1 | * | 5/2024 | H04L 27/34 |
| EP | 4489360 A1 | * | 1/2025 | H04L 27/3809 |
| JP | 7175434 B2 | * | 11/2022 | H04B 10/516 |
| JP | 7392240 B2 | * | 12/2023 | H04L 1/004 |
| KR | 2174601 B1 | * | 11/2020 | |
| KR | 20220101098 A | * | 7/2022 | H04W 72/20 |
| WO | WO-2018121887 A1 | * | 7/2018 | H04L 27/3411 |
| WO | WO-2018133938 A1 | * | 7/2018 | H04L 1/007 |
| WO | WO-2018133939 A1 | * | 7/2018 | H04L 1/0041 |
| WO | WO-2019029529 A1 | * | 2/2019 | H04L 1/0052 |
| WO | WO-2019197043 A1 | * | 10/2019 | H03M 7/3068 |
| WO | WO-2020075120 A2 | * | 4/2020 | H04B 10/556 |
| WO | WO-2020075120 A3 | * | 5/2020 | H04B 10/58 |
| WO | WO-2020108771 A1 | * | 6/2020 | H04L 27/3411 |
| WO | WO-2020174275 A1 | * | 9/2020 | H04J 14/0298 |
| WO | WO-2020208290 A1 | * | 10/2020 | H04L 1/0042 |
| WO | WO-2021105548 A1 | * | 6/2021 | H04L 1/0057 |
| WO | WO-2021135421 A1 | * | 7/2021 | H04L 27/3405 |
| WO | WO-2022183472 A1 | * | 9/2022 | H04L 27/20 |
| WO | WO-2023105685 A1 | * | 6/2023 | H03M 13/1515 |
| WO | WO-2023241808 A1 | * | 12/2023 | H04L 27/361 |

OTHER PUBLICATIONS

Supplementary European Search Report—EP21928555—Search Authority—Munich—Jan. 9, 2025.
Supplementary Partial European Search Report—EP21928555—Search Authority—Munich—Oct. 9, 2024.

* cited by examiner

CONSTELLATION SHAPING-RELATED CODING SELECTION

This application is a national stage application under 35 U.S.C. § 371 of PCT Application No. PCT/CN2021/079254, filed Mar. 5, 2021. The entire contents of PCT Application No. PCT/CN2021/079254 is incorporated herein by reference in its entirety.

TECHNICAL FIELD

The technology discussed below relates generally to wireless communication systems, and more particularly, to generation of a waveform utilizing probabilistic constellation shaping in connection with modulation to carry information. Embodiments can provide and enable techniques for encoding an information sequence when using probabilistic constellation shaping.

INTRODUCTION

Many modern wireless communication systems employ a form of modulation commonly known as quadrature amplitude modulation (QAM). QAM is an effective technique for carrying binary digits (bits) of information, where a symbol of n bits is represented by transmission of two 90° out-of-phase sinusoidal signals (e.g., orthogonal or quadrature signals) at a given carrier frequency (e.g., a subcarrier or tone). However, usage of QAM with a typical grid-like constellation with uniform bit-probability has been empirically demonstrated to be limited to an achievable capacity that fails to meet the Shannon capacity. As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In some aspects, this disclosure provides a method, apparatus, and non-transitory computer-readable medium for wireless communication. A wireless communication device receives a source information sequence representing a message for transmission. If probabilistic constellation shaping is to be applied, the device encodes the source information sequence based on a systematic-type code; and if probabilistic constellation shaping is not to be applied, the device encodes the source information sequence based on a non-systematic-type code. The device generates a sequence of symbols representing the message for transmission and transmits a waveform based on the generated sequence of symbols.

In further aspects, this disclosure provides another method, apparatus, and non-transitory computer-readable medium for wireless communication. A wireless communication device generates a set of probabilistically-shaped symbols corresponding to at least a first portion of a source information sequence. The device further generates a pre-encoding sequence corresponding to at least a second portion of the source information sequence, and applies error correction coding to the pre-encoding sequence to generate an encoded sequence comprising a set of systematic bits and a set of parity bits. Accordingly, the device generates a first set of non-probabilistically-shaped symbols corresponding to at least a portion of the set of parity bits, replaces a portion of the set of probabilistically-shaped symbols with the set of non-probabilistically shaped symbols to generate an output sequence, and modulates a waveform based on the output sequence.

In still further aspects, this disclosure provides another method, apparatus, and non-transitory computer-readable medium for wireless communication. A wireless communication device receives a waveform comprising a set of probabilistically-shaped symbols and a set of non-probabilistically shaped symbols. The device then demodulates the received waveform to generate a sequence of bits and decodes the sequence of bits by omitting a portion of the bits corresponding to a portion of the set of probabilistically-shaped symbols.

And in still further aspects, the present disclosure provides another method, apparatus, and non-transitory computer-readable medium for wireless communication. Based on a source information sequence, a wireless communication device generates a sequence of symbols representing a message for transmission. The device further encodes the source information sequence based on a systematic-type code if at least a portion of the generated sequence of symbols has a probabilistic constellation shaping property, or based on a non-systematic-type code if the sequence of symbols does not have the probabilistic constellation shaping property. The device then transmits a waveform based on the generated sequence of symbols.

These and other aspects of the technology discussed herein will become more fully understood upon a review of the detailed description, which follows. Other aspects, features, and embodiments will become apparent to those of ordinary skill in the art, upon reviewing the following description of specific, exemplary embodiments in conjunction with the accompanying figures. While the following description may discuss various advantages and features relative to certain embodiments and figures, all embodiments can include one or more of the advantageous features discussed herein. In other words, while this description may discuss one or more embodiments as having certain advantageous features, one or more of such features may also be used in accordance with the various embodiments discussed herein. In similar fashion, while this description may discuss exemplary embodiments as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, those skilled in the art will readily recognize that these concepts may be practiced without these specific details. In some instances, this description provides well known structures and components in block diagram form in order to avoid obscuring such concepts.

While this description describes aspects and embodiments by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
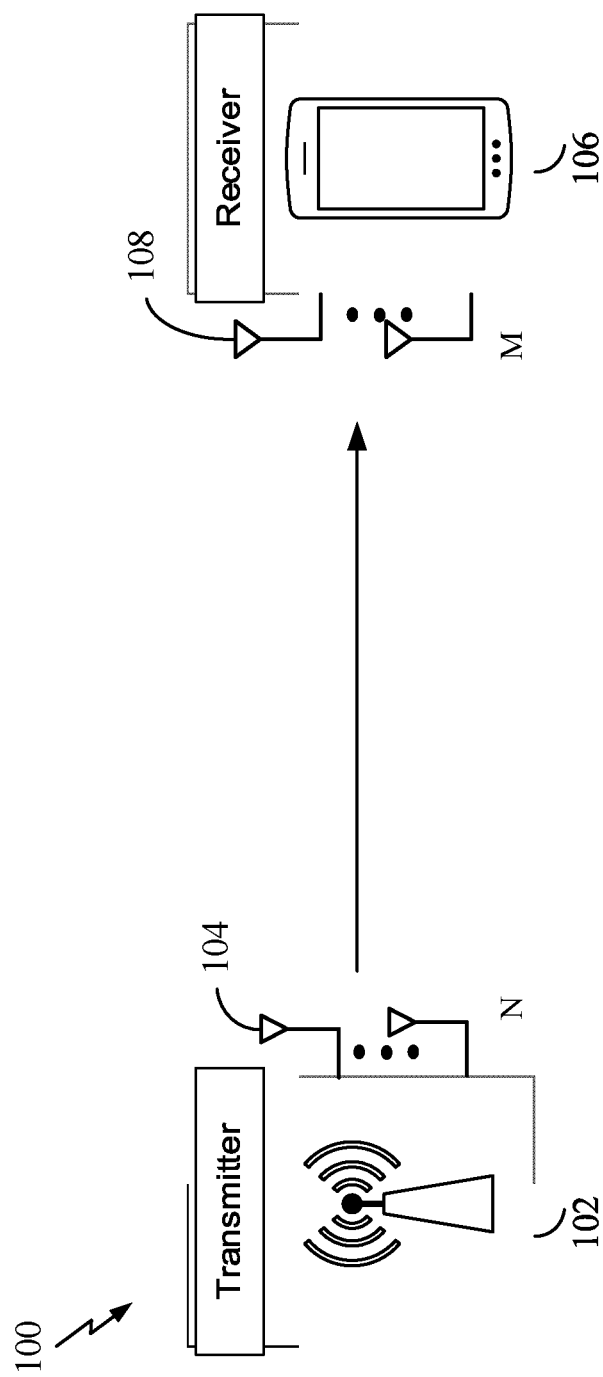
FIG. 1 is a schematic illustration of a wireless communication link according to some aspects of this disclosure.

The disclosure that follows presents various concepts that may be implemented across a broad variety of telecommunication systems, network architectures, and communication standards. Referring now to FIG. 1, as an illustrative example without limitation, this schematic illustration shows various aspects of the present disclosure with reference to a wireless communication link 100 between a transmitter 102 and a receiver 106.

The wireless communication link 100 may operate according to any suitable wireless communication technology or technologies to provide communication between the transmitter 102 and the receiver 106. As one example, the wireless communication link 100 may operate according to $3^{rd}$ Generation Partnership Project (3GPP) New Radio (NR) specifications, often referred to as 5G or 5G NR. As another example, the wireless communication link 100 may operate under a hybrid of 5G NR and Evolved Universal Terrestrial Radio Access Network (eUTRAN) standards, often referred to as Long-Term Evolution (LTE). 3GPP refers to this hybrid RAN as a next-generation RAN, or NG-RAN. Of course, many other examples may be utilized within the scope of the present disclosure.

In the illustrated example, the transmitter 102 is shown as a base station, and the receiver 106 is shown as a wireless user equipment (UE). However, this configuration is provided only for ease of description, and in various examples, the wireless communication link 100 may link any two or more wireless communication nodes of any suitable kind or category. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

A UE may be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication. Such UE components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A UE may additionally be an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a virtual reality device, a smart watch, a health or fitness tracker, a digital audio player (e.g., MP3 player), a camera, a game console, etc. A UE may additionally be a digital home or smart home device such as a home audio, video, and/or multimedia device, an appliance, a vending machine, intelligent lighting, a home security system, a smart meter, etc. A UE may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data and/or for relevant quality of service (QoS) for transport of critical service data.

Wireless communication between a transmitter 102 (e.g., a base station) and a receiver 106 (e.g., a UE) may be described as utilizing an air interface. Transmissions over the air interface from a base station to one or more UEs may be referred to as downlink (DL) transmission. In accordance with certain aspects of the present disclosure, the term "downlink" may refer to a point-to-multipoint transmission originating at a scheduling entity (described further below; e.g., a base station). Another way to describe this scheme may be to use the term broadcast channel multiplexing. Transmissions from a UE to a base station may be referred to as uplink (UL) transmissions. In accordance with further aspects of the present disclosure, the term "uplink" may refer to a point-to-point transmission originating at a scheduled entity (described further below; e.g., a UE).

In some examples, access to the air interface may be scheduled, wherein a scheduling entity (e.g., a base station) allocates resources for communication among some or all devices and equipment within its service area or cell. Within the present disclosure, as discussed further below, a scheduling entity may be responsible for scheduling, assigning, reconfiguring, and releasing resources for one or more scheduled entities (e.g., UEs). That is, for scheduled communication, a UE, which may be a scheduled entity, may utilize resources allocated by a scheduling entity (e.g., a base station or another UE).

Base stations are not the only entities that may function as scheduling entities. That is, in some examples, a UE may function as a scheduling entity, where the UE is configured for scheduling resources for one or more scheduled entities (e.g., one or more other UEs) in a wireless communication system.

In some aspects of the disclosure, the scheduling entity and/or scheduled entity may be configured for beamforming and/or multiple-input multiple-output (MIMO) technology. In a MIMO system, a transmitter 102 includes multiple transmit antennas 104 and a receiver 106 includes multiple receive antennas 108. The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

Figure 2:
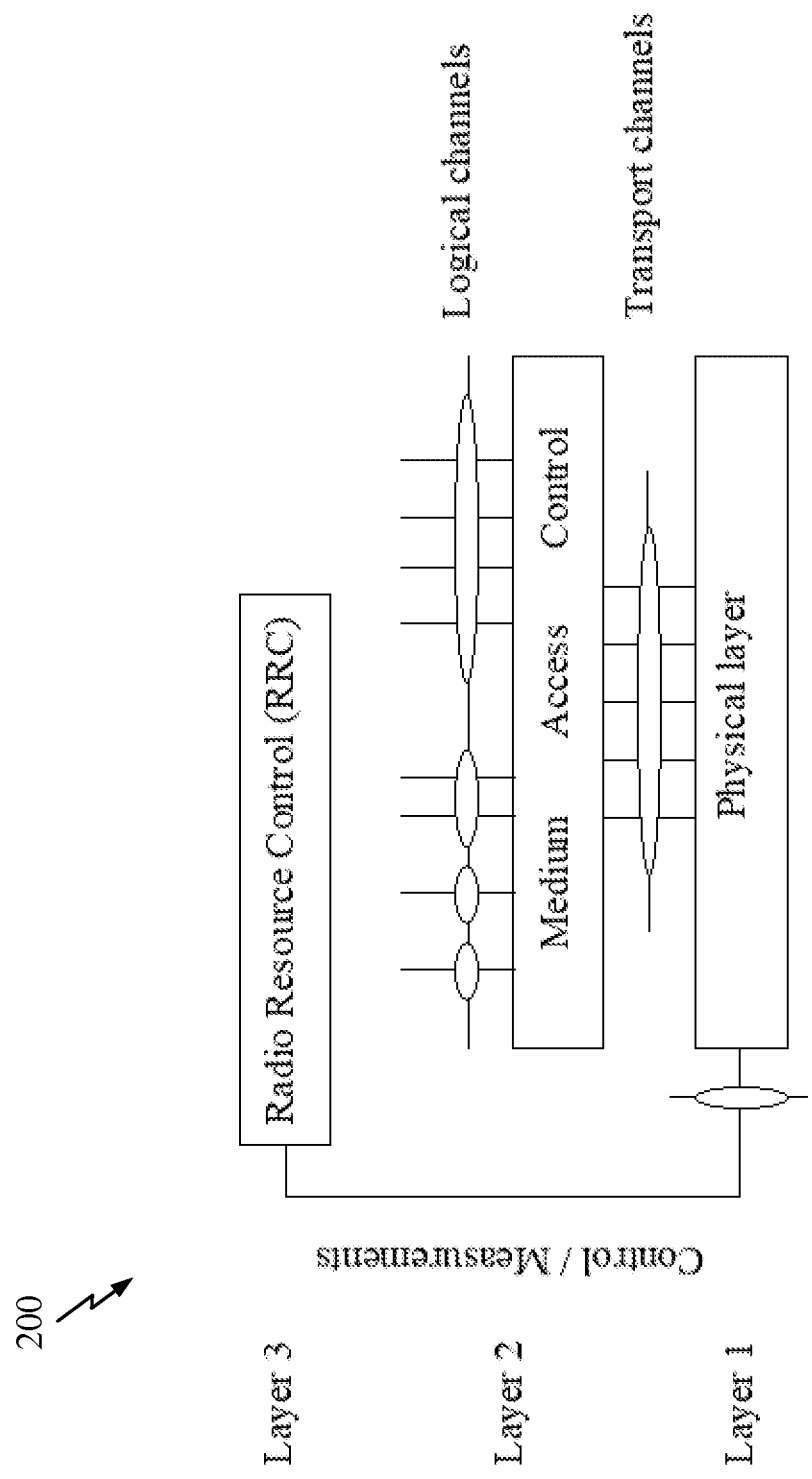
FIG. 2 is a schematic illustration of an example of a radio interface protocol architecture around a physical layer according to some aspects of this disclosure.

A radio protocol architecture may take on various forms depending on the particular application. An example for a NR system will now be presented with reference to FIG. 2, which schematically illustrates a radio interface protocol architecture around the physical layer (Layer 1). The physical layer interfaces the Medium Access Control (MAC) sub-layer of Layer 2 and the Radio Resource Control (RRC) Layer of Layer 3. The circles between different layer/sub-layers indicate Service Access Points (SAPs). The physical layer offers a transport channel to MAC. The transport channel is characterized by how the information is transferred over the radio interface. MAC offers different logical channels to the Radio Link Control (RLC) sub-layer of Layer 2. A logical channel is characterized by the type of information transferred.

The RRC sublayer is responsible for obtaining radio resources (e.g., radio bearers) and for configuring the lower layers using RRC signaling between a base station and UE. The MAC sublayer has various functions, such as allocating the various radio resources (e.g., resource blocks) in one cell among the UEs HARQ operations, etc. The physical layer also has various functions, such as channel coding, scrambling, modulation, transform precoding, mapping, etc.

In some examples, a MAC entity of a UE is configured to handle one or more transport channels. Example transport channels that the MAC entity may handle include: Broadcast Channels (BCHs); Downlink Shared Channels (DL-SCHs); Paging Channels (PCHs); Uplink Shared Channels (UL-SCHs); and Random Access Channels (RACHs), among others. In some examples, a UE may use a single MAC entity; and in some examples, a UE may use a plurality of MAC entities (e.g., one for a Master Cell Group (MCG) and one for a Secondary Cell Group (SCG) in a network configured for Dual Connectivity). Example MAC entities used by a UE may include source MAC entities and target MAC entities.

Figure 3:
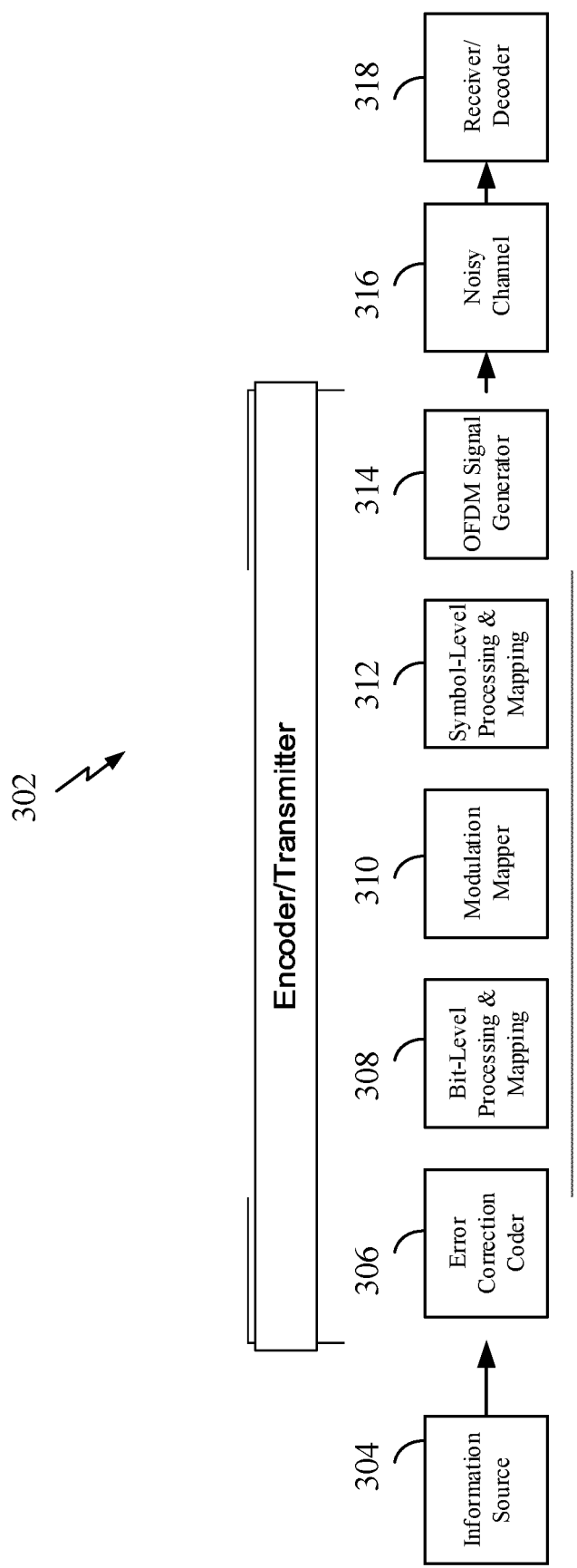
FIG. 3 is a block diagram illustrating an example of a physical layer entity of a transmitting device according to some aspects of this disclosure.

FIG. 3 is a schematic illustration providing additional information with respect to some components of a physical layer 302. The block diagram provided in FIG. 3 is not intended to show all components of a given physical layer, but is rather to be understood as providing some functional detail of a portion of an exemplary physical layer for the purpose of explanation of certain aspects of this disclosure. As shown in FIG. 3, a physical layer may receive a message or a set of information for communication from any suitable information source 304. For example, the MAC layer may provide a source information sequence to the physical layer entity 302 for transmission.

An error correction coder 306, or channel coder, employs forward error correction to map sequences of message bits (e.g., information blocks, code blocks, code block groups, etc.) to longer, redundant sequences (e.g., codewords). A bit-level processing block 308 can perform various functions such as scrambling, interleaving, etc., at a bit level. A modulation mapper 310 maps sequences of bits to corresponding symbols (e.g., complex numbers) according to a selected modulation scheme. Modulation refers to the way a carrier signal is modulated, or varied over time, to represent information to be transmitted. A symbol-level processing and mapping block 312 performs various functions, such as layer mapping, resource mapping, symbol-level interleaving, antenna mapping, etc. An OFDM signal generator 314 generates signals for transmission over a set of one or more antennas. OFDM refers to orthogonal frequency division multiplexing. That is, an air interface may be defined according to a two-dimensional grid of resource elements, defined by separation of resources in frequency by defining a set of closely spaced frequency tones or sub-carriers, and separation in time by defining a sequence of symbols having a given duration. By setting the spacing between the tones based on the symbol rate, inter-symbol interference can be essentially eliminated. OFDM channels provide for high data rates by allocating a data stream in a parallel manner across multiple subcarriers. In any case, OFDM signal generator 314 may transmit, via transceiver 104 or transceiver 108, a waveform modulated according to a sequence of symbols generated by symbol-level processing and mapping block 312.

When an apparatus transmits such a signal, the signal propagates over a noisy channel 316. As used throughout this disclosure, a "channel" generally refers to a medium through which a signal passes. Once transmitted, noise in the channel (e.g., random disturbances) can affect the signal before the signal arrives at a receiver/decoder device 318 (e.g., UE 106 or base station 102). The receiver/decoder device 318, then, attempts to process the received signal and reproduce the original information message.

Channel Coding

In order for transmissions over a noisy channel 316 to obtain a low block error rate (BLER) while still achieving very high data rates, an error correction coder 306 may implement channel coding. Wireless communication according to various aspects of this disclosure may generally utilize any suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for bit errors that may occur due to the noise.

In some examples, a channel coder may employ parity-check codes, where the encoder generates code words by combining blocks of message bits with blocks of check bits, where each check bit is a modulo-2 sum of a given set of the message bits. Such a parity-check code can be represented by a parity-check matrix. Among this group, low-density parity check codes generally refer to codes that are represented by a matrix with a low density of 1's, and mostly filled with 0's.

Figure 4:
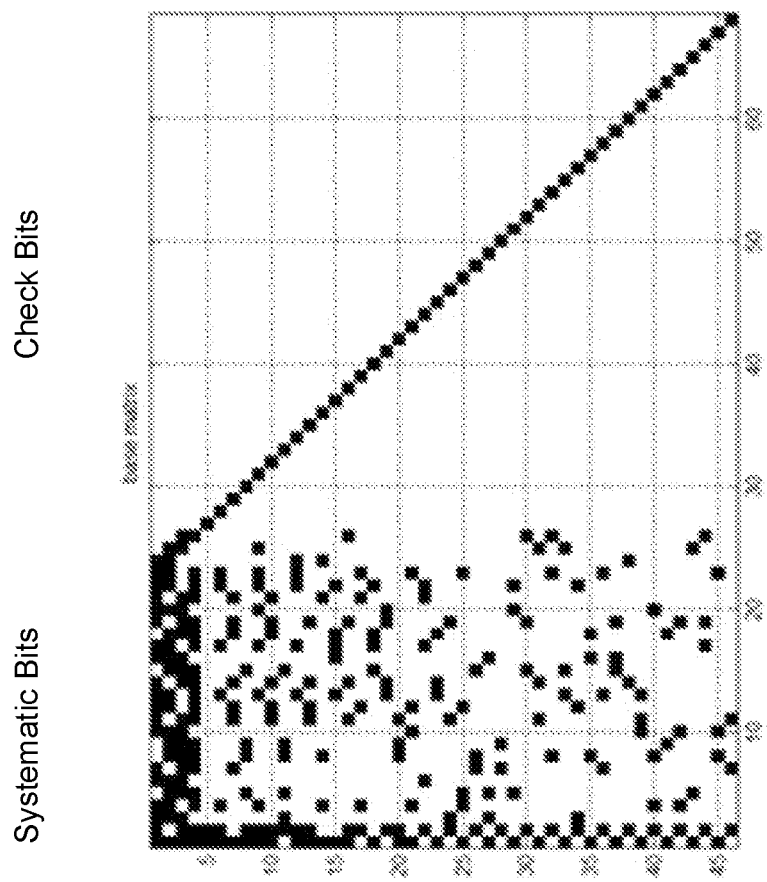
FIG. 4 is a schematic illustration of a low density parity check (LDPC) matrix according to some aspects of this disclosure.

FIG. 4 provides an example of a base graph that may be employed by a channel coder configured for LDPC coding. In 5G NR specifications, user data may be coded using quasi-cyclic low-density parity check (LDPC) codes with two different base graphs: one base graph for large code blocks and/or high code rates, while the other base graph is used otherwise. Control information and a physical broadcast channel (PBCH) may be coded using Polar coding, based on nested sequences. For these channels, puncturing, shortening, and/or repetition may be used for rate matching.

Those skilled in the art will understand that aspects of the present disclosure may be implemented utilizing any suitable channel code. Various implementations of scheduling entities (e.g., base station 102, or a UE 106) and scheduled entities 106 (e.g., UE 106) may include suitable hardware and capabilities (e.g., an encoder, a decoder, and/or a CODEC) to utilize one or more of these channel codes for wireless communication.

QAM

Figure 5:
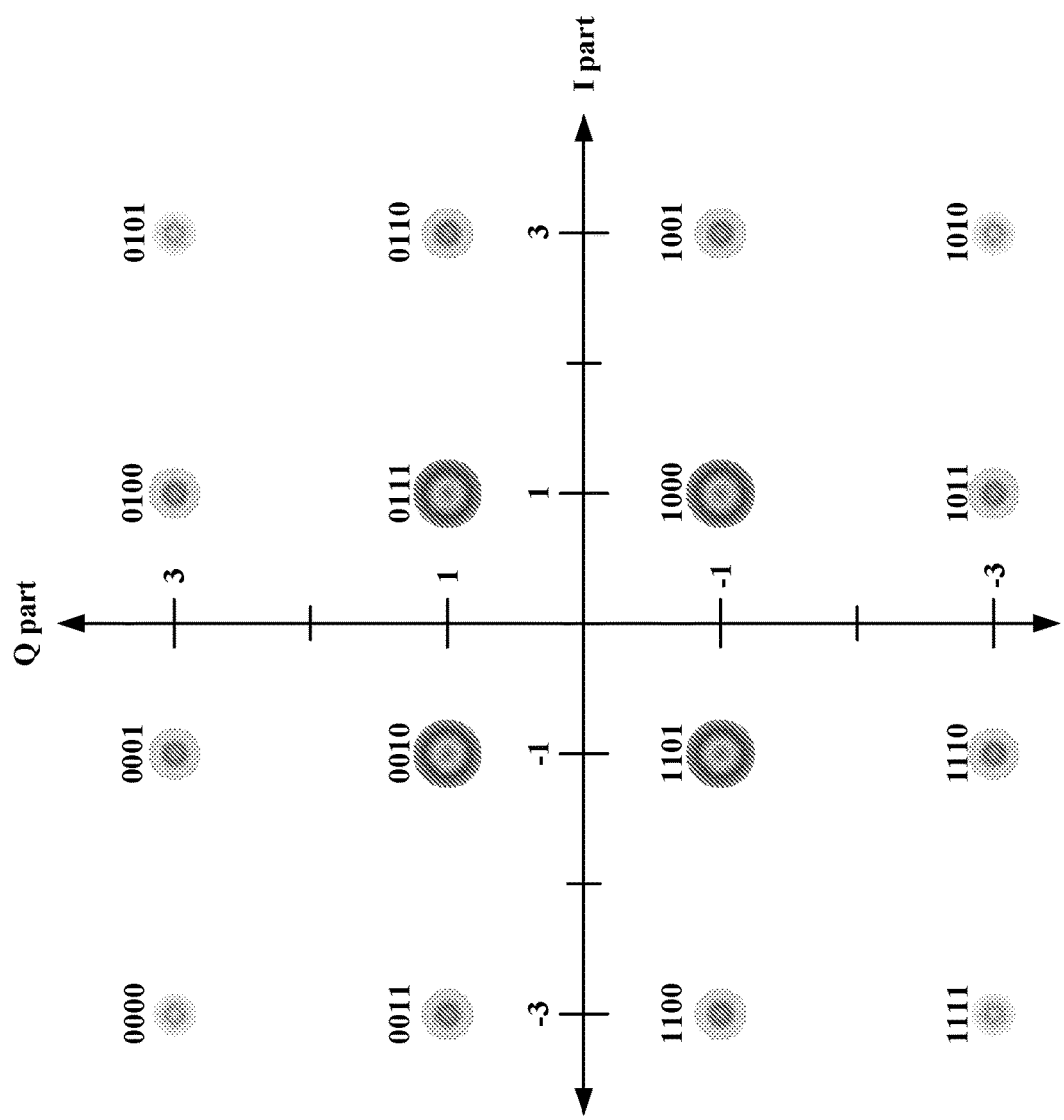
FIG. 5 is a constellation diagram showing examples of a probabilistically shaped constellation for quadrature amplitude modulation (QAM) according to some aspects of the disclosure.

Many modern wireless communication systems employ a form of modulation commonly known as quadrature amplitude modulation (QAM). QAM is an effective technique for carrying binary digits (bits) of information, where a symbol of n bits is represented by transmission of two 90° out-of-phase sinusoidal signals (e.g., orthogonal or quadrature signals) at a given carrier frequency (e.g., a subcarrier or tone). QAM is readily understood with reference to a constellation diagram. Referring now to FIG. 5, in a typical constellation diagram for QAM, a set of constellation points is arranged in a grid, and is mapped to the complex plane. In a constellation diagram with $2^n$ constellation points, each constellation point can represent a predefined n-bit sequence or symbol. For example, in the illustration, 16-QAM is shown, with $2^4=16$ constellation points each representing a respective 4-bit sequence or symbol. By treating the amplitudes of the respective quadrature signals as representative of a real part and an imaginary part of a complex number, in theory a transmission can represent any suitable complex number. With QAM, a modulation mapper maps an n-bit sequence to the appropriate complex number in the corresponding constellation diagram, and the amplitudes of the quadrature signals are scaled to represent the corresponding complex number.

Probabilistic Constellation Shaping

According to Shannon's Coding Theorem, introduced by Claude Shannon in 1948 and well-known to those skilled in the art, there exist theoretical bounds for a channel capacity in a given channel. A channel capacity generally represents a maximum transmission rate for a given channel based on the signal-to-noise ratio (SNR). This channel capacity may be generally referred to as the "Shannon capacity."

QAM typically employs a uniform constellation map having a uniform (e.g., grid-like) distribution of symbols in the complex plane, and a uniform (e.g., constant magnitude) probability of use of constellation symbols. QAM employing uniform constellation mapping has been empirically demonstrated to be limited to an achievable capacity that falls below the channel capacity. However, a non-uniform distribution of constellation symbols can improve channel performance with QAM, with an achievable capacity that better approximates, or in some cases, can even essentially meet the channel capacity of the channel used to transmit an information message.

In some examples, techniques for non-uniform distribution utilizing QAM include geometric constellation shaping and/or probabilistic constellation shaping. With geometric constellation shaping, each constellation point in the complex plane is generally utilized with an equal probability, but the location of the constellation points in the complex plane is altered from the uniform grid to exhibit a generally Gaussian amplitude distribution. With probabilistic constellation shaping (PCS), also referred to in the field as probabilistic amplitude shaping (PAS), a more conventional (e.g., grid-like) uniform distribution of symbols is used in the complex plane, but with a non-equal probability of use of the respective constellation symbols. Referring again to FIG. 5, one example of such a PAS constellation is shown, where the shading at each constellation point schematically represents the probability of the corresponding constellation symbol being employed for a transmission. It should be noted that, although a particular grid arrangement is shown in FIG. 4, the techniques of this disclosure are not so limited, and any number of different distribution grids may be used in various examples.

Figure 6:
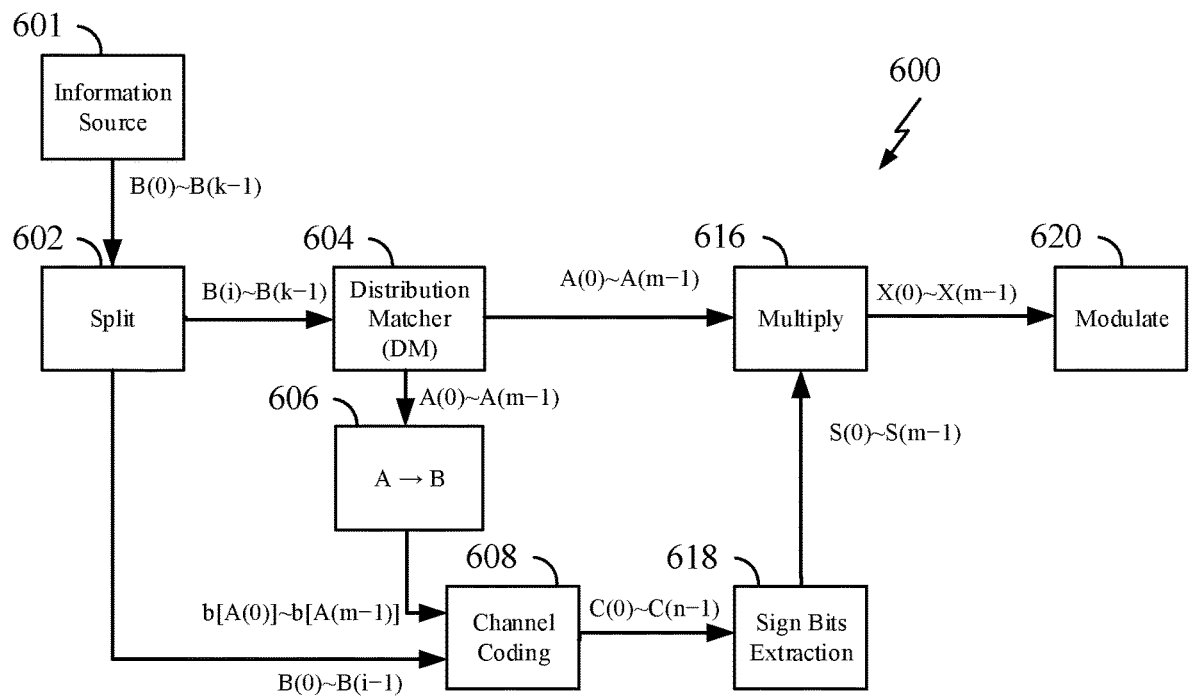
FIG. 6 is a schematic diagram illustrating an example implementation of a physical layer entity of a transmitting device configured for probabilistic constellation shaping (PCS) according to some aspects of the disclosure.
Figure 6:
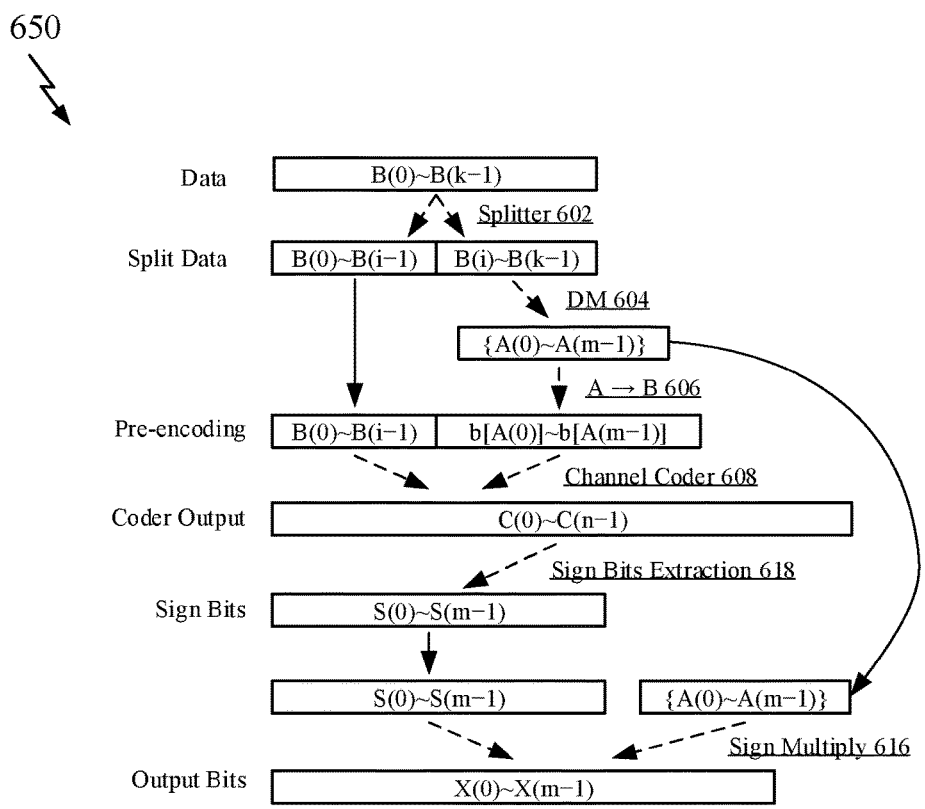

FIG. 6 includes a schematic block diagram illustrating one example of a physical layer entity implementing probabilistic constellation shaping (PCS). In the illustrated example, the functions or operations shown are performed from the point of view of a physical layer entity in a transmitting device. As shown, an information source 601 (e.g., a MAC layer or any other suitable source of information for transmission) provides a source information sequence B of k bits of binary data $\{B_0, \ldots, B_{k-1}\}$, where k is an integer. In the discussion that follows, the notation S(n)~S(p) is equivalent to, and interchangeable with, the notation $\{S_n, \ldots, S_p\}$ representing a sequence of (p−n+1) elements. Thus, the sequence B may be denoted B(0)~B(k−1).

A split block or function 602 splits, segments, or separates this source sequence into two parts, where a first part B(i)~B(k−1) includes a sequence of (k−i) bits, and a second part B(0)~B(i−1) includes a sequence of i bits, where i≤k is an integer.

The first part B(i)~B(k−1) of the data is provided to a distribution matcher (DM) 604 (e.g., a modulation mapper), which maps an input of (k−i) bits to an ordered sequence of (m) amplitudes A(0)~A(m−1) (where m is an integer), having the desired, nonuniform probabilities. This way, a transmitting device utilizing PAS can obtain a nonuniform (e.g., shaped) probability of symbols for the constellation. That is, a DM 604 takes as an input a sequence of (k−i) independent bits or symbols, and provides as an output a sequence of (m) amplitude symbols (e.g., complex numbers) having a nonuniform distribution of amplitudes that represents the message according to the PAS technique.

In various examples, a DM may utilize any of a number of suitable algorithms and have any of a number of suitable configurations. Some examples of DMs known in the art include a constant-composition DM (CCDM), a prefix-free distribution matching DM (PCDM), a multiset-partition DM (MPDM), a product bit-level DM, a parallel-amplitude DM with subset ranking, a streaming DM, shell mapping, enumerative sphere shaping, framing of variable-length DM outputs into fixed-length blocks, a DM with mark ratio control, etc. Although the aforementioned DM techniques differ from one another, in general, a DM system generates a probabilistically determined sequence of symbols configured with an aim to employ a probabilistically shaped waveform (e.g., a QAM waveform).

The second part B(0)~B(i−1) of the data is provided to a channel coder 608 (e.g., unchanged by the DM 604). In addition, the amplitude symbol sequence A(0)~A(m−1) from the DM 604 (configured according to the PAS technique) is converted to an ordered sequence of binary bits b[A(0)]~b[A(m−1)] by a suitably configured amplitude-to-binary (A→B) mapping block 606. That is, b[S(n)] represents the result of the application of a function or map b that maps an input sequence {S(n)}, consisting of amplitude symbols (e.g., S(n)∈ℂ), to an output sequence {B(q)}, consisting of binary symbols (i.e., B(q)∈(0, 1)). This sequence {B} of binary bits is also provided to the channel coder 608. In a particular example, any suitable function b for the generation of binary bit sequences based on an amplitude symbol sequence may be employed. For example, the A→B mapping block 606 may employ an M-ary amplitude to binary mapping technique, which generates a sequence of $\log_2(M) \cdot m$ binary bits.

Referring now to schematic timing diagram 650, the data from the information source 601 is shown in the first row, represented by the binary sequence B(0)~B(k−1). As shown in the second row, the splitter 602 splits, separates, or segments the data into two parts: one of which, as shown in the third row, is converted to a sequence of amplitude symbols based on PAS. As shown in the fourth row, part of the split data sequence is combined with a sequence of binary bits based on the amplitude symbol sequence, providing a pre-encoding input to the channel coder 608. As discussed above, the channel coder 608 takes as an input the second part B(0)~B(i−1) of the data, and a binary sequence b[A(0)]~b[A(m−1)] corresponding to a PAS-mapped portion of the data, i.e., the first part B(i)~B(k−1) of the data. The channel coder 608 encodes this input to generate an encoded output sequence, which in some examples, may be represented by a length-n sequence of parity bits C(0)~C(n−1), where n is an integer.

A sign bits extraction block 618 extracts a sequence of m sign bits S(0)~S(m−1) from the parity bits C(0)~C(n−1), which are provided to a sign multiply block 616, which combines the sign bits S(0)~S(m−1) with the sequence of amplitude symbols A(0)~A(m−1) from the DM 604 described above, to generate a sequence of output symbols X(0)~X(m−1). The output symbols are then modulated (e.g., according to QAM) for transmission via one or more antennas.

Channel Coding with Constellation Shaping

In order to provide for constellation shaping with channel coding, a systematic-type coding may be used. As is well known in the art, a systematic-type code generates a code word that includes the original input sequence, without change (e.g., unaltered). For example, the first R symbols of the code word may include the unaltered, original input sequence; and remaining symbols of the code word may be parity bits or check bits. In contrast, a nonsystematic-type code generates a code word where the input sequence is altered or changed during the encoding process. By utilizing a systematic-type code, for constellation shaping with coding assistance, only the parity of the coded information is changed, and all systematic bits are used to generate the same constellation.

However, concurrent channel coding (e.g., LDPC) may not provide a systematic output. For example, according to presently existing specifications for 3GPP 5G NR, an LDPC encoder may puncture the first two columns of its base graph or parity check matrix. For example, when employing a multi-edge type (MET) code with a lift size of $Z_c$, the first $2Z_c$ information bits are punctured. Thus, the first $2Z_c$ information bits are not transmitted. Therefore, the code is no longer a systematic code.

After puncturing these systematic bits, an encoder may replace them with parity bits or check bits. However, as discussed above, with probabilistic constellation shaping, the encoder 608 applies shaped symbols b[A(0)]~b[A(m−1)] to the check bits, while it applies a uniformly distributed constellation to the systematic bits. Thus, replacement of the punctured systematic bits with check bits compromises the probabilistic constellation shaping.

That is, if an encoder uses conventional, non-systematic coding with PCS, there is a potential loss of PCS-related shaping gain, and reduced throughput. And on the other hand, if the encoder uses a different (e.g., systematic) coding algorithm with PCS, while the PCS-related shaping gain can be preserved, there is a potential loss of coding gain.

In various aspects, the present disclosure provides a modulation and coding technique for probabilistic constellation shaping that can enable dynamic modulation and/or coding to avoid the issues caused by puncturing systematic bits represented by symbols with a probabilistically shaped constellation. That is, some aspects of this disclosure provide for a technique for probabilistic signal shaping and channel coding that outputs systematic bits and non-systematic bits, to support signals with and without probabilistic constellation shaping, respectively. In this way, a communication device can be enabled to achieve increased throughput based on the shaping gain provided by PCS.

Furthermore, if an encoder utilizes a conventional, non-systematic LDPC coding algorithm, the encoder is capable of adapting or controlling the transmission rate by changing characteristics of the encoder (e.g., the coding rate). However, if the encoder employs aspects of the presently disclosed PCS-based coding design, the encoder can adapt or control the transmission rate using the PCS mechanism without necessarily changing the characteristics of the encoder. Thus, employing PCS as described herein can provide an additional degree of freedom for an encoder to configure or optimize its transmission rate.

Example Block Diagram

Figure 7:
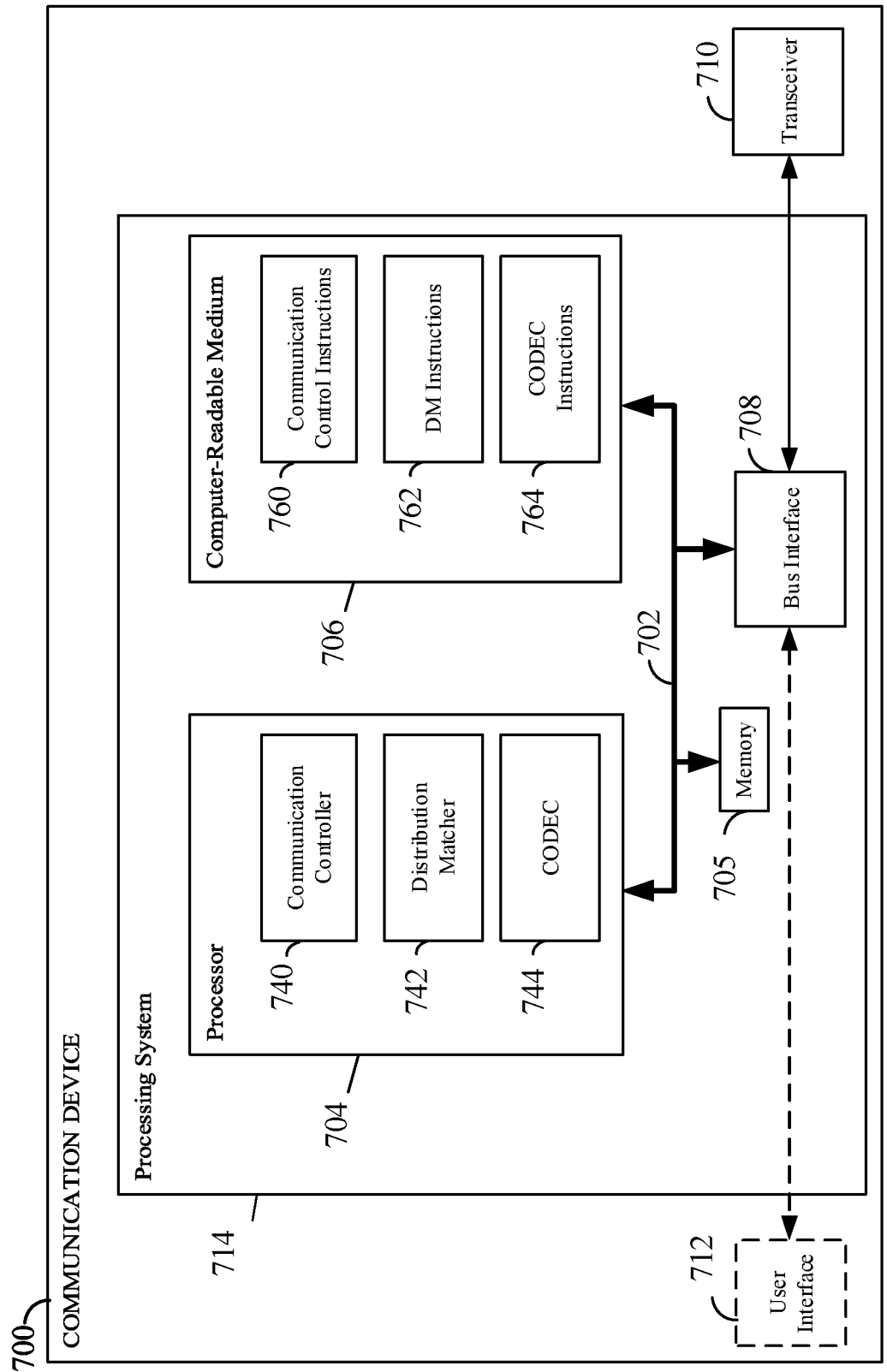
FIG. 7 is a block diagram conceptually illustrating an example of a hardware implementation for a communication device according to some aspects of this disclosure.

FIG. 7 is a block diagram illustrating an example of a hardware implementation for a communication device 700 employing a processing system 714 for channel coding with constellation shaping. For example, the communication device 700 may be a user equipment (UE) or base station, as illustrated in FIG. 1. In another example, the communication device 700 may be, or may include, a physical layer entity as illustrated in any one or more of FIGS. 3, 6, and/or 10.

The communication device 700 may include a processing system 714 having one or more processors 704. Examples of processors 704 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In some examples, the processor 704 may include, and/or may be coupled to an encoder as illustrated in FIG. 3, and/or a portion of an encoder as illustrated in FIGS. 6 and/or 10. In various examples, the communication device 700 may be configured to perform any one or more of the functions described herein. That is, the processor 704, as utilized in a communication device 700, may be configured (e.g., in coordination with the memory 705) to implement any one or more of the processes and procedures described below and illustrated in FIGS. 8, 9, 11, 12, 13, and/or 14.

The processing system 714 may be implemented with a bus architecture, represented generally by the bus 702. The bus 702 may include any number of interconnecting buses and bridges depending on the specific application of the processing system 714 and the overall design constraints. The bus 702 communicatively couples together various circuits including one or more processors (represented generally by the processor 704), a memory 705, and computer-readable media (represented generally by the computer-readable medium 706). The bus 702 may also link various other circuits such as timing sources, peripherals, voltage regulators, and power management circuits, which are well known in the art, and therefore, will not be described any further. A bus interface 708 provides an interface between the bus 702 and a transceiver 710. The transceiver 710 provides a communication interface or means for communicating with various other apparatus over a transmission medium. For example, the transceiver 710 may apply a suitable modulation (e.g., probabilistically constellation shaped) and transmitting a modulated waveform. The transceiver 710 may further receive a waveform transmission, e.g., including any suitable (e.g., PCS) modulation and demodulating the received transmission. Depending upon the nature of the communication device, a user interface 712 (e.g., keypad, display, speaker, microphone, joystick) may also be provided. Of course, such a user interface 712 is optional, and some examples, such as a base station, may omit it.

Figure 9:
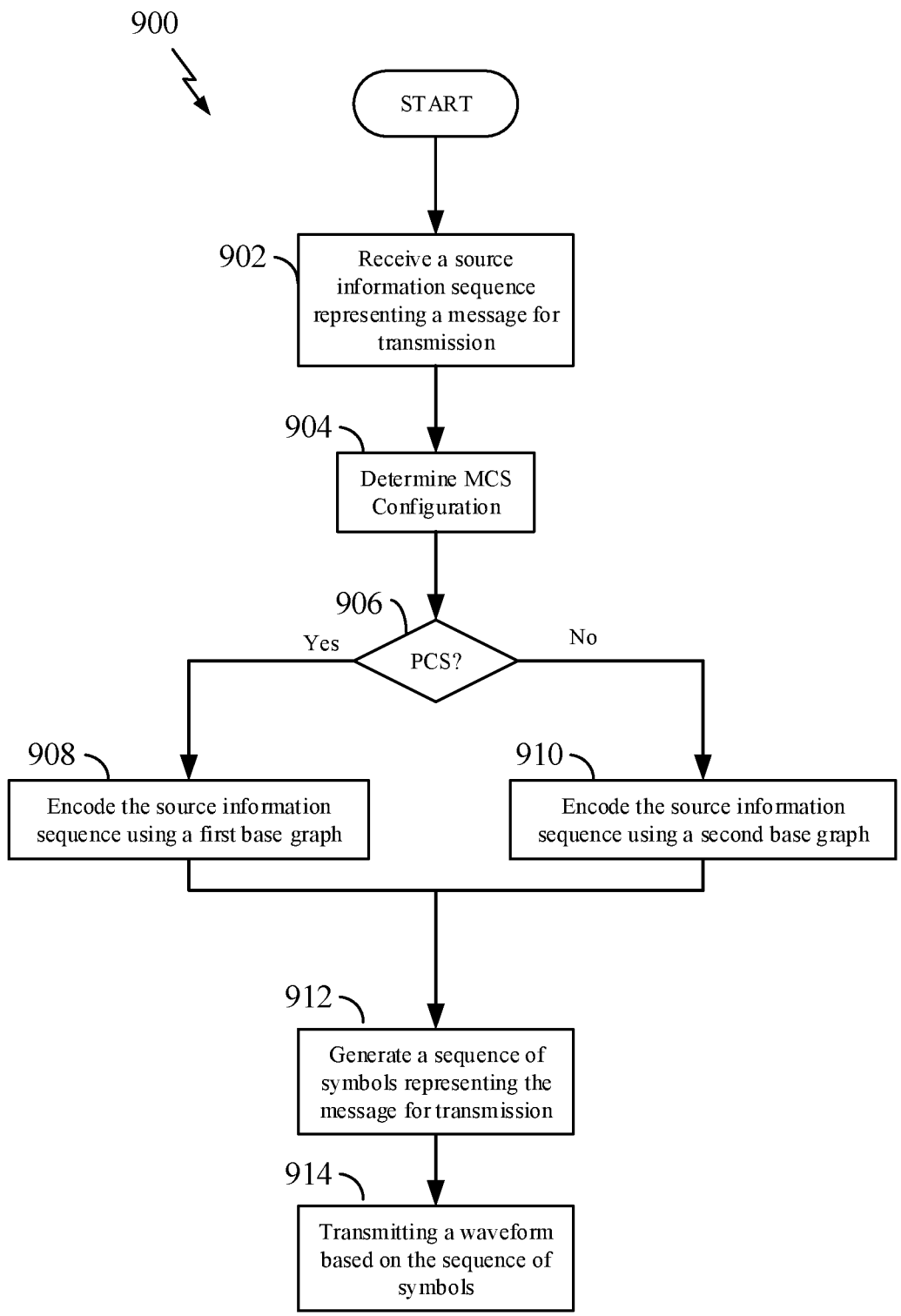
FIG. 9 is a flow chart illustrating an exemplary process for constellation shaping-related coding in accordance with further aspects of the disclosure.
Figure 10:
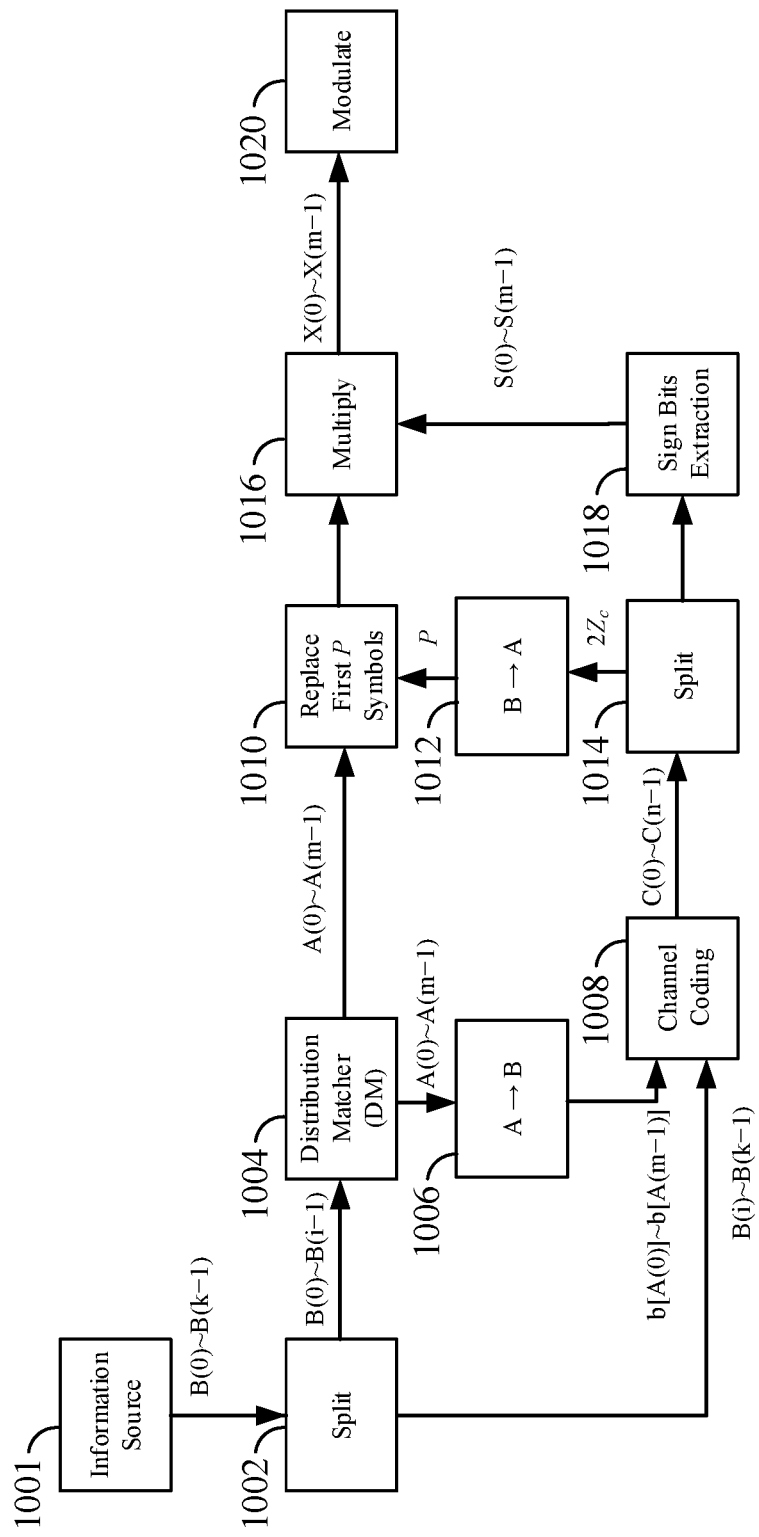
FIG. 10 is a block diagram illustrating a portion of a communication device configured for replacing information-associated symbols with corresponding parity-associated symbols according to some aspects of the present disclosure.

In some aspects of the disclosure, the processor 704 may include communication control circuitry 740 configured (e.g., in coordination with the memory 705) for various functions, including, e.g., receiving and applying configuration information for, e.g., configuring a modulation and coding scheme (MCS) for a message transmission, for determining whether to apply probabilistic constellation shaping (PCS) for a message transmission, for generating non-probabilistically shaped symbols, and for puncturing and replacing bits and/or symbols in their respective sequences. For example, the communication control circuitry 740 may be configured to implement one or more of the functions described below in relation to FIG. 8, including, e.g., blocks 802, 804, 806, 812, and/or 814; FIG. 9, including, e.g., blocks 902, 904, 906, 912, and/or 914; FIG. 10, including, e.g., blocks 1002, 1006, 1010, 1012, 1014, 1016, 1018, and/or 1020; and/or FIG. 12, including, e.g., blocks 1206, 1208, 1210, and/or 1212.

Figure 12:
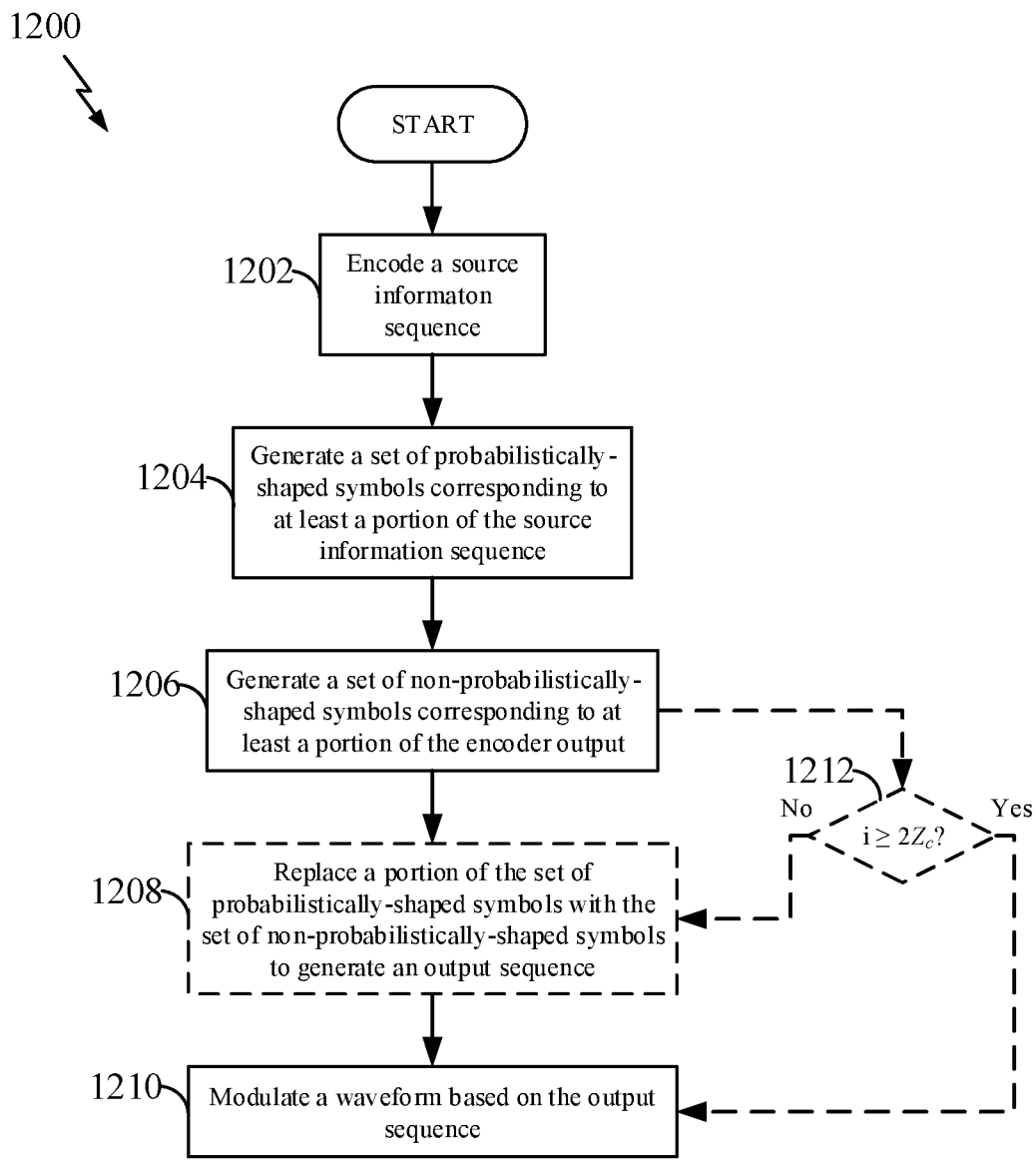
FIG. 12 is a flow chart illustrating an exemplary process for constellation shaping-related coding in accordance with further aspects of the present disclosure.

In further aspects of the disclosure, the processor 704 may include distribution matching (DM) circuitry 742 configured (e.g., in coordination with the memory 705) for various functions, including, e.g., generating probabilistically-shaped symbols. In some examples, the DM circuitry 742 may correspond to a modulation mapper, as described above; and in some examples, such a modulation mapper may be configurable to select probabilistic or non-probabilistic constellation mapping. For example, the DM circuitry 742 may be configured to implement one or more of the functions described below in relation to FIG. 8, including, e.g., block 812; FIG. 9, including, e.g., block 912; FIG. 10, including, e.g., block 1004; FIG. 12, including, e.g., block 1204; and/or FIG. 15, including, e.g., block 1502.

Figure 14:
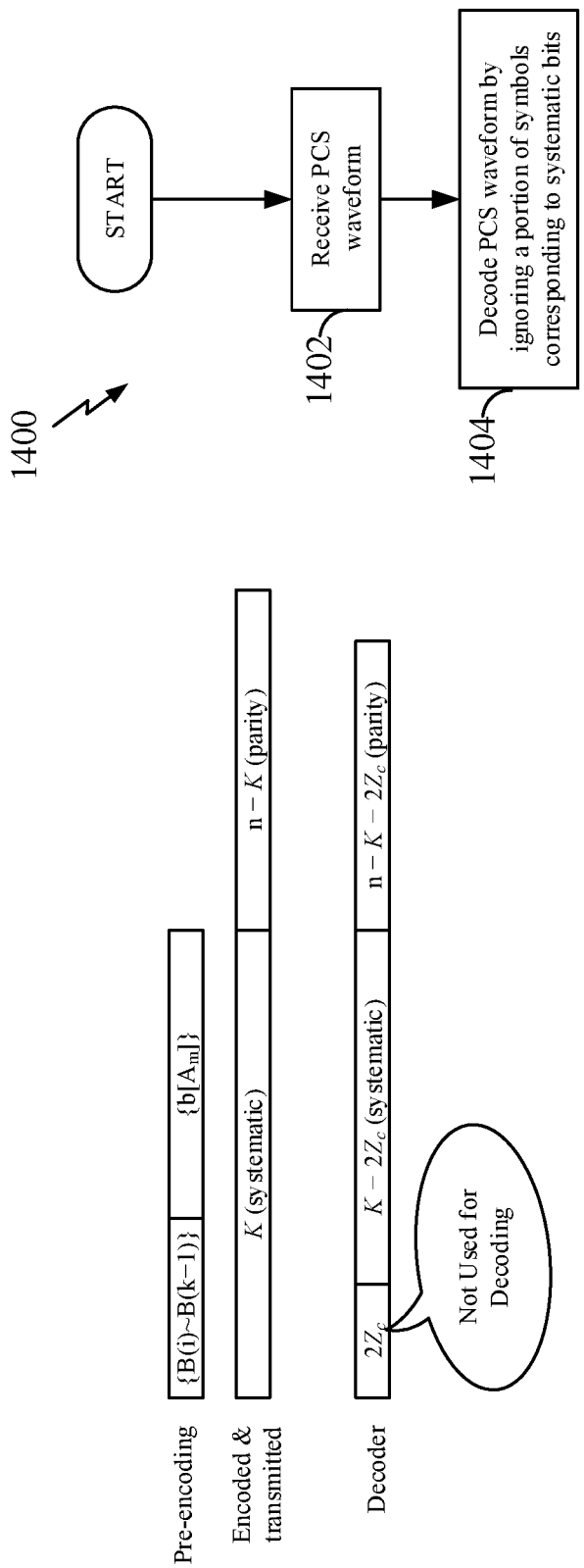
FIG. 14 is a schematic timing diagram showing various stages of a probabilistic shaping-related coding process according to still further aspects of the present disclosure.

In further aspects of the disclosure, the processor 704 may include an error correction coder or CODEC circuitry 744 configured (e.g., in coordination with the memory 705) for various functions, including, e.g., applying forward error correction or channel coding to generate an encoded sequence utilizing any suitable systematic or non-systematic code, and/or decoding an encoded sequence. Here, the CODEC circuitry 744 may be dynamically controlled or configured to apply any suitable base graph or coding type. For example, the CODEC circuitry 744 may be configured to implement one or more of the functions described below in relation to FIG. 8, including, e.g., blocks 808 and/or 810; FIG. 9, including, e.g., blocks 908 and/or 910; FIG. 10, including, e.g., block 1008; FIG. 12, including, e.g., block 1202; FIG. 14, including, e.g., block 1404; and/or FIG. 15, including, e.g., blocks 1506 and/or 1508.

The processor 704 is responsible for managing the bus 702 and general processing, including the execution of software stored on the computer-readable medium 706. The software, when executed by the processor 704, causes the processing system 714 to perform the various functions described below for any particular apparatus. The processor 704 may also use the computer-readable medium 706 and the memory 705 for storing data that the processor 704 manipulates when executing software.

One or more processors 704 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 706. The computer-readable medium 706 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 706 may reside in the processing system 714, external to the processing system 714, or distributed across multiple entities including the processing system 714. The computer-readable medium 706 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 706 may store computer-executable code that includes communication control instructions 760 that configure a communication device 700 for various functions, including, e.g., receiving and applying configuration information for, e.g., configuring a modulation and coding scheme (MCS) for a message transmission, for determining whether to apply probabilistic constellation shaping (PCS) for a message transmission, for generating non-probabilistically shaped symbols, and for puncturing and replacing bits and/or symbols in their respective sequences. For example, the communication control instructions 760 may be configured to implement one or more of the functions described below in relation to FIG. 8, including, e.g., blocks 802, 804, 806, 812, and/or 814; FIG. 9, including, e.g., blocks 902, 904, 906, 912, and/or; FIG. 10, including, e.g., blocks 1002, 1006, 1010, 1012, 1014, 1016, 1018, and/or 1020; and/or FIG. 12, including, e.g., blocks 1206, 1208, 1210, and/or 1212.

In further examples, the computer-readable storage medium 706 may store computer-executable code that includes distribution matching (DM) (e.g., modulation mapping) instructions 762 that configure a communication device 700 for various functions, including, e.g., generating probabilistically-shaped symbols. For example, the DM instructions 762 may be configured to implement one or more of the functions described below in relation to FIG. 8, including, e.g., block 812; FIG. 9, including, e.g., block 912; FIG. 10, including, e.g., block 1004; FIG. 12, including, e.g., block 1204; and/or FIG. 15, including, e.g., block 1502.

In further examples, the computer-readable storage medium 706 may store computer-executable code that includes error correction coding/decoding (CODEC) instructions 764 that configure a communication device 700 for various functions, including, e.g., applying channel coding to generate an encoded sequence utilizing any suitable systematic or non-systematic code, and/or decoding an encoded sequence. Here, the CODEC circuitry 744 may be dynamically controlled or configured to apply any suitable base graph or coding type. For example, the CODEC instructions 764 may be configured to implement one or more of the functions described below in relation to FIG. 8, including, e.g., blocks 808 and/or 810; FIG. 9, including, e.g., blocks 908 and/or 910; FIG. 10, including, e.g., block 1008; FIG. 12, including, e.g., block 1202; FIG. 14, including, e.g., block 1404; and/or FIG. 15, including, e.g., blocks 1506 and/or 1508.

In one configuration, the communication device 700 includes means for receiving a source information sequence, means for determining an MCS configuration, means for determining whether to apply PCS for a message transmission, means for encoding and/or decoding a message (e.g., by applying error correction coding) based on any suitable coding algorithm, means for generating probabilistically-shaped symbols, means for generating non-probabilistically shaped symbols, and means for bit-level and/or symbol-level processing and mapping. In one aspect, the aforementioned means may be the processor(s) 704 shown in FIG. 7 configured to perform the functions recited by the aforementioned means. In another aspect, the aforementioned means may be a circuit or any apparatus configured to perform the functions recited by the aforementioned means.

Of course, in the above examples, the circuitry included in the processor 704 is merely provided as an example, and other means for carrying out the described functions may be included within various aspects of the present disclosure, including but not limited to the instructions stored in the computer-readable storage medium 706, or any other suitable apparatus or means described in any one of the FIGS.

1, 2, 3, 6, 7, and/or 10, and utilizing, for example, the processes and/or algorithms described herein in relation to FIGS. 8, 9, 11, 12, 13, 14, and/or 15.

Figure 8:
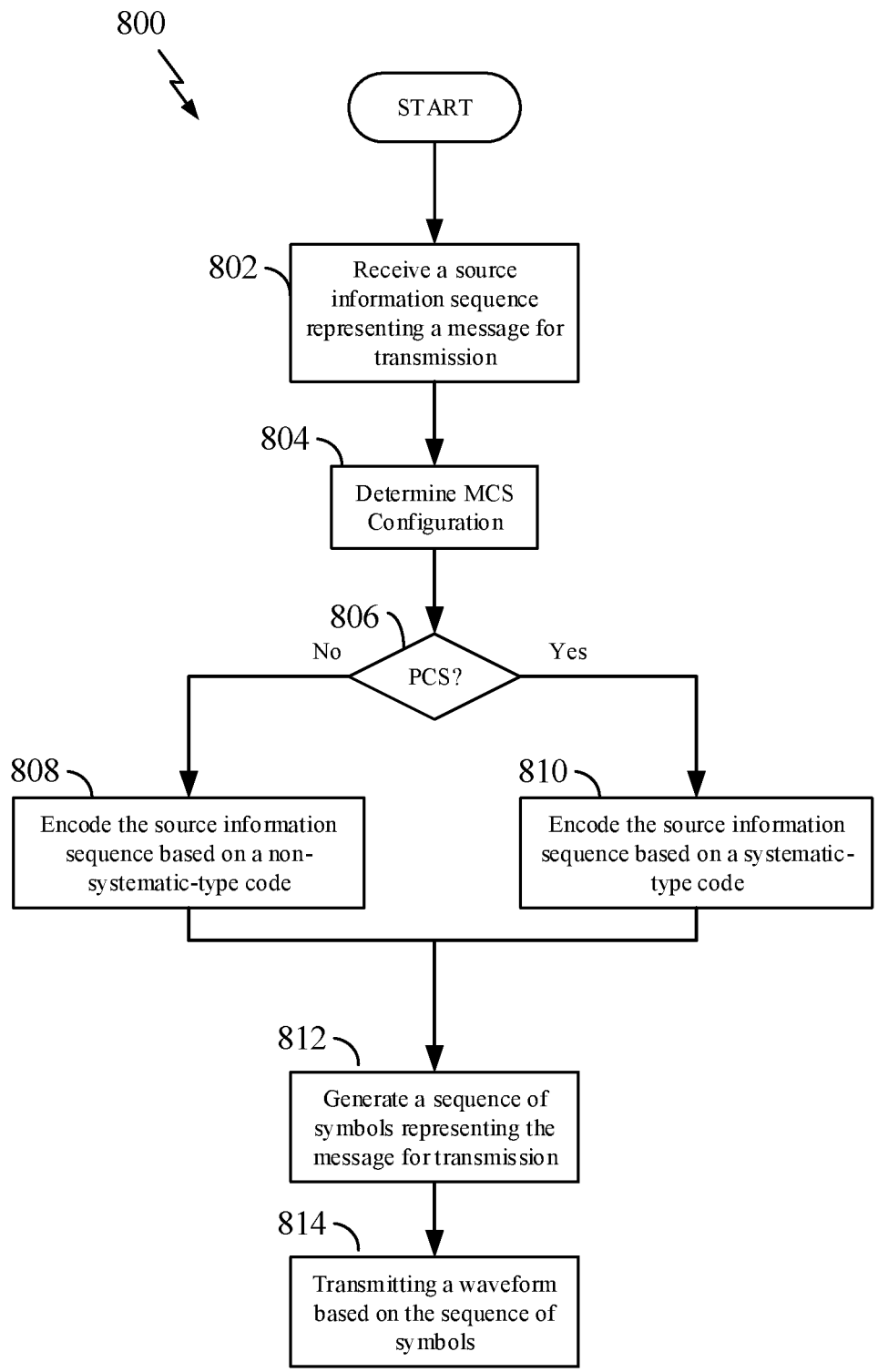
FIG. 8 is a flow chart illustrating an exemplary process for constellation shaping-related coding in accordance with some aspects of the disclosure.

Selection Between Systematic Coding and Non-Systematic Coding with Puncturing of Systematic Bits Based on Whether PCS is Applied FIG. 8 is a flow chart illustrating an exemplary process 800 for constellation shaping-related coding in accordance with some aspects of the present disclosure. In this example, a communication device decides to utilize systematic-type coding if probabilistic constellation shaping is to be applied, and to utilize a non-systematic-type coding (e.g., NR-LDPC including puncturing of a portion of the systematic bits) if probabilistic constellation shaping is not to be applied.

As described below, a particular implementation may omit some or all illustrated features, and may not require some illustrated features to implement all embodiments. In some examples, the communication device 700 illustrated in FIG. 7 may be configured to carry out the process 800. In some examples, any suitable apparatus or means for carrying out the functions or algorithm described below may carry out the process 800. In the illustrated example, the functions or operations shown are performed from the point of view of a physical layer entity in a communication device. For example, an encoder, which may include probabilistic signal shaping and channel coding features, may be configured to implement the process illustrated in FIG. 8.

As illustrated, at block 802, a communication device may receive a source information sequence representing a message for transmission. For example, a physical layer entity may receive information from any suitable source, such as a MAC layer entity as described above.

At block 804, the communication device may determine a configuration for a modulation and coding scheme (MCS) to apply to a given block of information (e.g., a transport block, a source information sequence, a code block, a code block group, or any other suitable set of information). For example, a modem or other physical layer entity may receive (e.g., from a higher layer entity such as a MAC entity) a suitable set of configuration parameters, such as MCS parameters or other configuration parameters, indicating configuration information such as how many bits are to be encoded, a code rate, what the output bit length will be, etc.

At block 806, the communication device may determine whether the configuration indicates that probabilistic constellation shaping is to be applied. For example, the modem may determine whether a received set of configuration parameters includes one or more constellation shaping parameters. That is, according to an aspect of the present disclosure, if the configuration indicates that probabilistic constellation shaping is to be applied, the configuration received at block 804 may include one or more suitable constellation shaping parameters. Some examples of constellation shaping parameters can include a binary-bits-to-amplitude-symbols mapping parameter, a distribution parameter for configuring a DM for shaping a constellation for a target probability distribution, and an explicit (e.g., direct) instruction whether to apply probabilistic constellation shaping. In general, the modem may identify any suitable parameter that enables or configures PCS as a parameter sufficient to apply probabilistic constellation shaping.

If the communication device determines that probabilistic constellation shaping is to be applied, then at block 810 an encoder may utilize a systematic coding output for encoding the source information sequence. On the other hand, if the device determines that probabilistic constellation shaping is not to be applied, then at block 808 the encoder may utilize a non-systematic coding output (e.g., legacy coding according to 5G NR specifications for LDPC coding) for encoding the source information sequence.

In various examples, the encoder may employ any suitable systematic coding algorithm in the case that PCS is to be applied, such that the coding algorithm is compatible with PCS. In some examples, the systematic coding corresponding to block 806 may utilize the same base graph as the non-systematic LDPC coding corresponding to block 808. In a further example, an encoder may employ the following puncturing parameter for LDPC encoding, such that all components related to puncturing that currently indicate a value of $2Z_c$ are changed to Z':

$$Z' = \begin{cases} 0 & \text{if } PCS \text{ is applied} \\ 2Z_c & \text{if } PCS \text{ is not applied} \end{cases}$$

For example, the modem may set a value of a puncturing parameter (e.g., Z') to zero (0) when a systematic-type coding is applied (e.g., when PCS is applied); and the modem may set a value of the puncturing parameter to a nonzero value (e.g., $2Z_c$) when a non-systematic-type coding is applied (e.g., when PCS is not applied).

At block 812, the wireless communication device may generate a sequence of symbols representing the message for transmission. For example, a distribution matcher (if probabilistic constellation shaping is applied) or a binary-to-amplitude converter (if probabilistic constellation shaping is not applied) may convert at least a portion of the source information sequence into a sequence of amplitude symbols.

At block 814, the wireless communication device may transmit a waveform based on the sequence of symbols. For example, a transceiver 710 may generate a waveform based on the generated sequence of symbols and transmit the waveform over a wireless transmission, as described above.

Example 2—Selection Between Different Base Graphs

FIG. 9 is a flow chart illustrating an exemplary process 900 for constellation shaping-related coding in accordance with some aspects of the present disclosure. In this example, a communication device decides to utilize a first base graph for channel coding if probabilistic constellation shaping is to be applied, and to utilize a second base graph for channel coding if probabilistic constellation shaping is not to be applied.

As described below, a particular implementation may omit some or all illustrated features, and may not require some illustrated features to implement all embodiments. In some examples, the communication device 700 illustrated in FIG. 7 may be configured to carry out the process 900. In some examples, any suitable apparatus or means for carrying out the functions or algorithm described below may carry out the process 900. In the illustrated example, the functions or operations shown are performed from the point of view of a physical layer entity in a transmitting device. For example, an encoder, which may include probabilistic signal shaping and channel coding features, may be configured to implement the process illustrated in FIG. 9.

As illustrated, at block 902, a communication device may receive a source information sequence representing a message for transmission. For example, a physical layer entity may receive information from any suitable source, such as a MAC layer entity as described above.

At block 904, the communication device may determine an MCS configuration, for example as described above in connection with block 804. And also similar to the procedure of FIG. 8, at block 906, the device may determine whether a set of received configuration parameters indicates that the device is to apply probabilistic constellation shaping, e.g., by including one or more suitable constellation shaping parameters.

If the device determines that probabilistic constellation shaping is to be applied, then at block 908 it may encode the source information sequence utilizing a first base graph. On the other hand, if the encoder determines that probabilistic constellation shaping is not to be applied, then at block 910 the device may encode the source information sequence utilizing a second base graph, different from the first base graph. In various examples, any suitable base graphs may be employed for selection between different base graphs based on whether PCS is to be applied. For example, selection of a base graph may be made based on one or more performance characteristics (e.g., throughput, coding gain, etc.) for each respective configuration. In some examples, a first base graph may correspond to a systematic code, while a second base graph may correspond to a non-systematic code. Accordingly, the wireless communication device may select between a first base graph for systematic coding if PCS is to be applied, and a second base graph for non-systematic coding if PCS is not to be applied.

At block 912, the wireless communication device may generate a sequence of symbols representing the message for transmission. For example, a distribution matcher (if probabilistic constellation shaping is applied) or a binary-to-amplitude converter (if probabilistic constellation shaping is not applied) may convert at least a portion of the source information sequence into a sequence of amplitude symbols.

At block 914, the wireless communication device may transmit a waveform based on the sequence of symbols. For example, a transceiver 710 may generate a waveform based on the generated sequence of symbols and transmit the waveform over a wireless transmission, as described above.

Example 3—Replace Punctured Symbols with Parity Bits

FIG. 10 provides a functional illustration of a portion of a communication device configured for constellation shaping-related coding according to a further aspect of this disclosure. In this example, as further described below, the communication device may replace certain information-associated symbols being punctured with parity-associated symbols. Some of the functional blocks illustrated in FIG. 10 may be the same or similar to blocks having the same name, described above and illustrated in FIG. 6. The description that follows is simplified for clarity in relation to those blocks that are the same or similar, with reference to FIG. 6 as needed.

Figure 11:
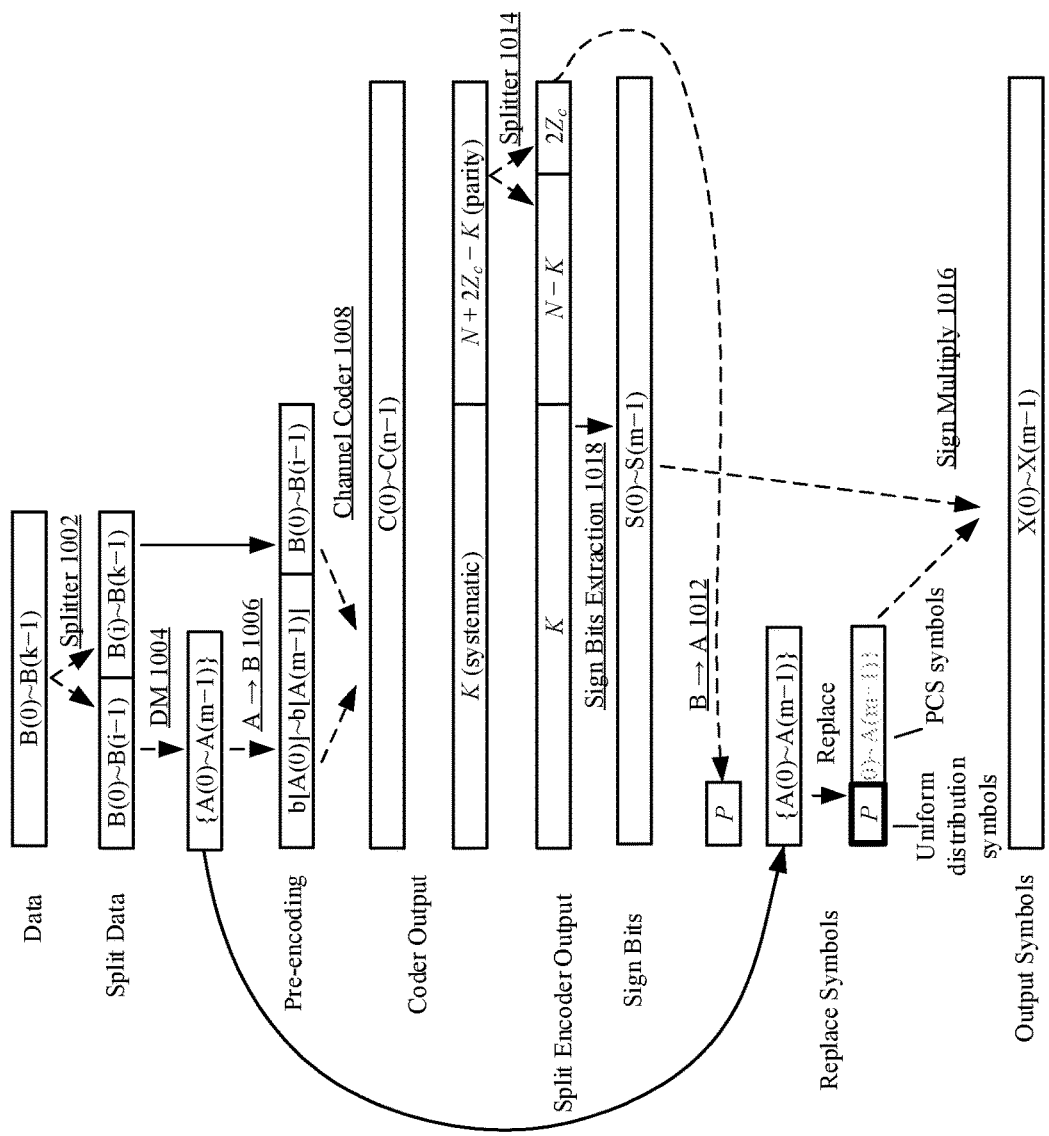
FIG. 11 is a schematic timing diagram showing various stages of the encoding process corresponding to FIG. 10.

FIG. 11 provides a schematic timing diagram showing various stages of the process corresponding to FIG. 10. In this illustration, time generally moves forward in the downward direction from row to row. In the following discussion, reference is made to elements in both FIGS. 10 and 11.

A suitable information source 1001 provides a sequence B, having k bits of binary data $\{B_0, \ldots, B_{k-1}\}$, to the illustrated encoder. A split block 1002 splits, segments, or separates the source information sequence B into two parts (e.g., a first subsequence and a second subsequence): B(0)~B(i−1) and B(i)~B(k−1), as in the example of FIG. 6. This split may correspond to any suitable division or segmentation of the source information sequence into two or more subsequences that may or may not be mutually exclusive of one another. Once the source information sequence is split, in the illustrated example, the split block 1002 provides the first subsequence B(0)~B(i−1) to a DM 1004, and provides the second subsequence B(i)~B(k−1) to a channel coder 1008. As in the example of FIG. 6, any suitable DM 1004 and channel coder 1008 may be utilized in a given implementation. In the discussion that follows, for completeness, an example having a channel coder 1008 configured for LDPC coding is described.

The DM 1004 maps its input B(0)~B(i−1) to an output sequence A having elements A(0)~A(m−1) shaped according to probabilistic constellation shaping. The DM 1004 provides its PCS sequence A to a suitably configured amplitude-to-binary (A→B) mapping block 1006, which maps the symbol sequence A to an ordered sequence of binary bits b[A(0)]~b[A(m−1)]. The A→B block 1006 provides this binary sequence to the channel coder block 1008.

The channel coder 1008 encodes its pre-encoding input sequence (in the illustrated example, the pre-encoding input sequence may be represented as a concatenation of the binary sequence b[A(0)]~b[A(m−1)] corresponding to a PCS-mapped portion of the source sequence, and the second part B(i)~B(k−1) of the source information sequence, which is not subject to probabilistic constellation shaping, and is mapped to a uniformly distributed constellation). The channel coder 1008 encodes this input to generate an encoded output sequence C, which in some examples, may be represented by a sequence of parity bits C(0)~C(n−1). In some examples that employ a systematic-type code, this encoded sequence C can be represented as including a set of K systematic bits, and a set of (n−K) parity bits (note that the encoded output sequence C includes n bits). And in some examples that employ a systematic-type code, the encoded sequence C can include the parity bits but omit the systematic bits, with the systematic bits being sourced directly from the DM 1004 and later concatenated with the parity bits.

In the description that follows, for reasons that will become clear, a new parameter $N=(n-2Z_c)$ is introduced. The parameter 4 was described above in relation to puncturing operations of an LDPC encoder configured according to 3GPP specifications for 5G NR. Thus, the number (n−K) of parity bits of the encoded output sequence C may equivalently be represented by $(N+2Z_c-K)$.

Block 1014 represents a sequence split or segmentation operation, such that this block splits the output C of the channel coder 1008 into two or more output sequences. In the example illustrated in FIG. 11, this results in the coder output having a representation with three segments: a first segment including K systematic bits, a second segment including (N−K) parity bits, and a third segment including $2Z_c$ parity bits.

That is, the splitter 1014 splits or separates a set of $2Z_c$ bits from the parity bits of the encoded output sequence C. In some examples, the last or final set of $2Z_c$ bits may be the separated bits, but any suitable set of $2Z_c$ bits may be separated in a given example. The split block 1014 then provides the segment of $2Z_c$ bits to a suitably configured binary-to-analog (B→A) mapping block, which converts those bits to an output sequence having a number P of amplitude symbols. In an aspect of this disclosure, the (B→A) mapping block 1012 performs the inverse operation or function of the (A→B) mapping block 1006.

The (B→A) mapping block 1012 provides its output sequence of P amplitude symbols to block 1010, which operates to replace the first P symbols (e.g., the set of P symbols of the amplitude symbol sequence A(0)~A(m−1), which are associated with the first $2Z_c$ bits of the systematic bits), with the output sequence from block 1012. That is, in an aspect of this disclosure, a portion of the systematic bits corresponding to the first $2Z_c$ bits of that sequence, may be punctured. The punctured portion is then replaced with the same number $2Z_c$ of bits (e.g., the last $2Z_c$ bits) from the non-systematic (e.g., parity) bits.

As discussed above, the amplitude symbol sequence A output by the DM 1004 corresponds to a sequence of probabilistically-shaped QAM-format symbols. However, as discussed above, the set of P symbols output by the (B→A) mapping block 1012 was not subject to distribution matching. That is, in an aspect of this disclosure, the (B→A) mapping block 1012 may generate a sequence of QAM-format symbols based on the $2Z_c$ parity bits of the encoded sequence C. Here, the output of the (B→A) mapping block 1012 is not subjected to distribution matching, and thus, the set of P replacement symbols are uniformly-distributed QAM symbols. Accordingly, block 1010 replaces the punctured shaped-amplitude symbols from the symbol sequence A with P non-shaped symbols corresponding to a constellation with uniformly-distributed probabilities, from the non-systematic (parity) portion of the encoder output.

A sign bits extraction block 1018 extracts a sequence S of m sign bits from the parity bits C, and provides the sign bit sequence S to a sign multiply block 1016. The sign multiply block 1016 then combines the sign bit sequence S with the sequence A of amplitude symbols from the DM 1004 described above (having symbols corresponding to punctured bits replaced), to generate a sequence of output symbols X(0)~X(m−1). A modulation function 1020 then modulates the output symbols (e.g., according to QAM) for transmission via one or more antennas.

With this example, an encoder may be configured to encode a given block of information utilizing a non-systematic code, even when employing constellation shaping. For example, an encoder may employ an LDPC coding algorithm where a sequence of $2Z_c$ bits is punctured from the systematic bits (corresponding to PCS shaped-amplitude symbols), and replaced with a sequence of $2Z_c$ bits (corresponding to non-shaped symbols) sourced from the sequence of parity bits or sign bits.

FIG. 12 is a flow chart illustrating an exemplary process 1200 for constellation shaping-related coding in accordance with some aspects of the present disclosure, e.g., corresponding to FIGS. 10 and 11 and their corresponding description above. As described below, a particular implementation may omit some or all illustrated features, and may not require some illustrated features to implement all embodiments. In some examples, the communication device 700 illustrated in FIG. 7 may be configured to carry out the process 1200. In some examples, any suitable apparatus or means for carrying out the functions or algorithm described below may carry out the process 1200. In the illustrated example, the functions or operations shown are performed from the point of view of a physical layer entity in a transmitting device. For example, an encoder, which may include probabilistic signal shaping and channel coding features, may be configured to implement the process illustrated in FIG. 12.

At block 1202, a transmitting device may encode a source information sequence utilizing a suitable error correction code, e.g., an LDPC code (e.g., utilizing a channel coder 1008, as described above). Here, the encoded output sequence includes a set of systematic bits and a set of non-systematic (e.g., parity or check) bits.

At block 1204, the transmitting device may generate a set of probabilistically-shaped symbols (e.g., PCS-QAM symbols) corresponding to at least a portion of the source information sequence (e.g., utilizing a DM 1004, as described above). According to some examples, the set of probabilistically-shaped symbols may correspond to at least a portion of the systematic bits, or the part of the source information sequence that appears unaltered in the encoded output sequence.

At block 1206, the transmitting device may generate a set of non-probabilistically-shaped symbols (e.g., QAM symbols with a uniformly distributed constellation) corresponding to at least a portion of the encoded output sequence (e.g., utilizing a B→A mapper 1012 as described above). According to some examples, the non-probabilistically-shaped symbols may correspond to at least a portion of the parity bits, or the non-systematic part of the encoded output sequence.

At block 1208, the transmitting device may replace a portion of the set of probabilistically-shaped symbols, with a set of non-probabilistically-shaped symbols corresponding to a portion of the parity bits. For example, the transmitting device may puncture a given number of symbols (e.g., the number P of symbols that represent a set of $2Z_c$ bits according to a suitable mapping algorithm between binary bits and analog symbols) of the shaped-symbol sequence, corresponding to the systematic bits, with a corresponding number of symbols from the non-shaped, uniform constellation symbol sequence, corresponding to the non-systematic bits.

At block 1210, the transmitting device may modulate and transmit a waveform based on the output sequence. For example, a modulation block 1020 may generate a waveform corresponding to the amplitude sequence for transmission, and a transceiver 710 may transmit the waveform, as described above.

Modifying the Symbol Sequence

Figure 13:
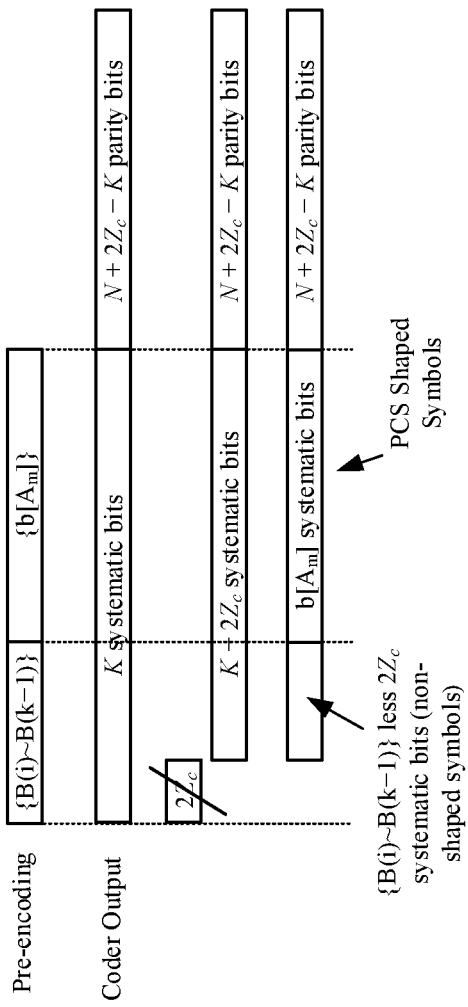
FIG. 13 is a schematic timing diagram showing various stages of a probabilistic shaping-related coding process according to a further aspect of the present disclosure.

FIG. 13 provides a schematic timing diagram showing various stages of a probabilistic shaping-related encoding process according to another aspect of the present disclosure. In some aspects, the process illustrated in FIG. 13 can be considered a modification of the process described above and illustrated in FIGS. 10-12. However, as shown in FIG. 13, the order or sequence of the symbols corresponding to systematic bits is modified to reduce or eliminate the impact of a puncturing operation on the probabilistically shaped symbols. That is, with reference to the example shown in FIG. 11, the bits corresponding to the shaped PCS symbols A(0)~A(m−1) are located at the front of the pre-encoding input sequence. In this case, as described above, when puncturing is applied to the first bits of the systematic bits, at least a portion of the probabilistically shaped symbols become punctured, and are replaced with other symbols.

However, in the example of FIG. 13, the sequence of bits $\{b[A_m]\}$ corresponding to the sequence of PCS symbols $\{A_m\}$ is placed at the end or rear of the pre-encoding input sequence. At the front or beginning of the pre-encoding input sequence appear the systematic bits corresponding to the subsequence B(i)~B(k−1). And, as described above (see FIG. 10), the symbols corresponding to the subsequence B(i)~B(k−1) are not subject to probabilistic constellation shaping, and are mapped to a uniformly distributed constellation. Accordingly, a puncturing of bits at the beginning of the systematic bits may not affect any shaped symbols, as long as the number of bits that are punctured is less than or equal to the number of bits of the subsequence B(i)~B(k−1). Further, even in the case where greater than the number of bits of the subsequence B(i)~B(k−1) are punctured, the impact to the PCS shaped symbols can be reduced relative to the previous example.

Accordingly, in some examples employing the sequence operations described above and illustrated in FIG. 13, a communication device can follow the procedure illustrated in the flow chart of FIG. 12, but omitting block 1208 to replace punctured bits with parity bits.

In a still further aspect of this disclosure, at block 1212, a communication device may decide whether or not to replace punctured bits corresponding to shaped symbols, based on whether a puncturing operation results in a puncturing of bits corresponding to shaped symbols. For example, denote the number of bits of the subsequence B(i)~B(k−1) as q. In an example where q≥the number of punctured bits (e.g., $2Z_c$), then the puncturing does not extend beyond the bits of the subsequence B(i)~B(k−1), and an operation corresponding to block 1208 can be omitted. However, in an example where q<the number of punctured bits (e.g., $2Z_c$), then the puncturing extends beyond the bits of the sequence B(i)~B(k−1). In this case, the communication device may replace punctured bits with parity bits formulated from symbols with a uniformly distributed constellation, as described above in block 1208.

Receiver-Based Example

FIG. 14 provides a schematic timing diagram showing various stages of a probabilistic shaping-related encoding process according to a still further aspect of the present disclosure. FIG. 14 further provides a flow chart illustrating an exemplary process 1400 for constellation shaping-related decoding in accordance with some aspects of the present disclosure. As described below, a particular implementation may omit some or all illustrated features, and may not require some illustrated features to implement all embodiments.

At block 1402, a communication device may receive a PCS waveform. In some aspects, the process illustrated in FIG. 14 can be considered a modification of the process described above and illustrated in FIGS. 10-12. However, as shown in FIG. 14, systematic bits are not replaced with parity bits. Instead, the systematic bits may be fully included in the transmission. That is, the code may be transmitted largely according to conventional procedures, except for omitting the last $2Z_c$ bits of the sequence of parity bits. At a receiving device, at block 1404, the first $2Z_c$ bits of the set of systematic bits are not used during a decoding process. Rather, a decoder may apply a suitable decoding procedure, e.g., one corresponding to a punctured LDPC code, to decode the remaining bits.

Figure 15:
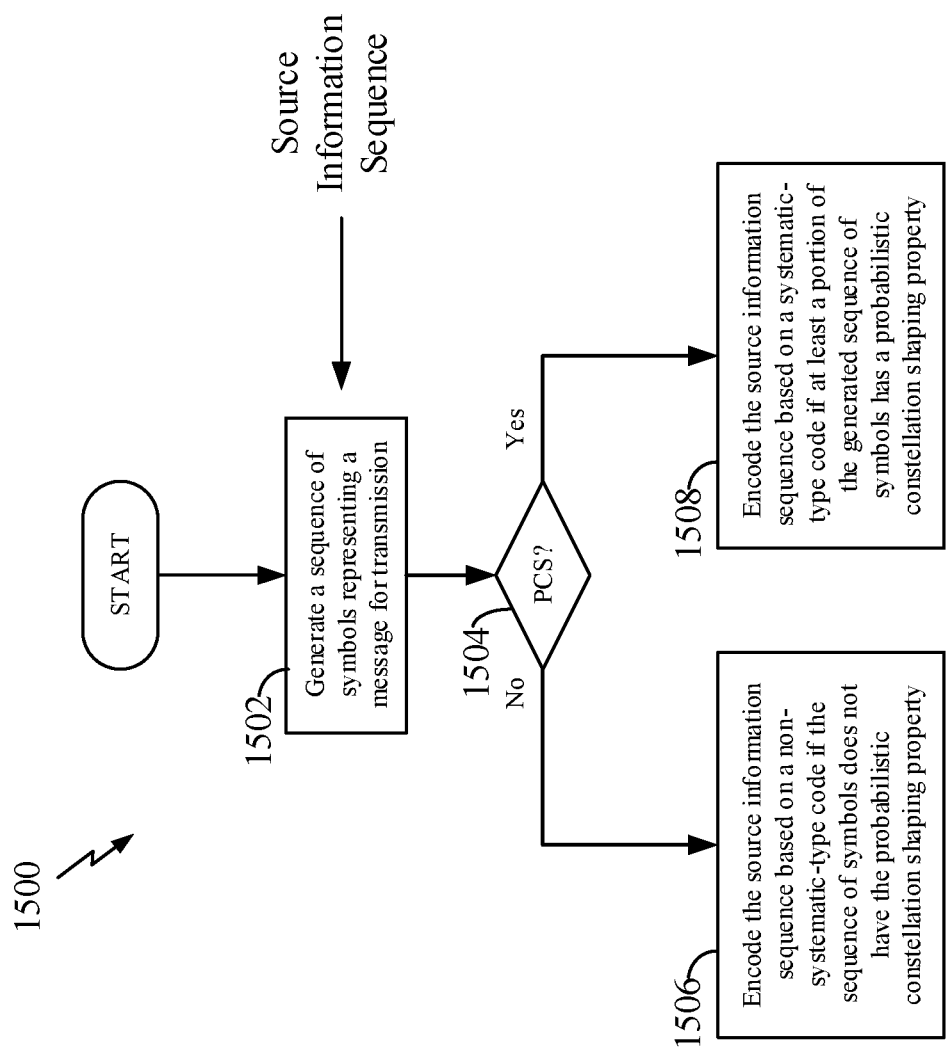
FIG. 15 is a flow chart illustrating an exemplary process for constellation shaping-related coding in accordance with further aspects of the present disclosure.

FIG. 15 is a flow chart illustrating an exemplary process 1500 for constellation shaping-related coding in accordance with some aspects of the present disclosure. As described below, a particular implementation may omit some or all illustrated features, and may not require some illustrated features to implement all embodiments. In some examples, the communication device 700 illustrated in FIG. 7 may be configured to carry out the process 1500. In some examples, any suitable apparatus or means for carrying out the functions or algorithm described below may carry out the process 1500. In the illustrated example, the functions or operations shown are performed from the point of view of a physical layer entity in a transmitting device. For example, an encoder, which may include probabilistic signal shaping and channel coding features, may be configured to implement the process illustrated in FIG. 15.

At block 1502, a wireless communication device generates, based on a source information sequence, a sequence of symbols representing a message for transmission. For example, a modulation mapper, a DM, or any other suitable symbol generator may be utilized to convert, e.g., a binary sequence into a complex amplitude sequence.

At block 1504, the device determines whether probabilistic constellation shaping is applied. For example, the device may determine whether a received set of configuration parameters includes one or more constellation shaping parameters. That is, according to an aspect of the present disclosure, if the configuration indicates that probabilistic constellation shaping is to be applied, the configuration received at block 1504 may include one or more suitable constellation shaping parameters. Some examples of constellation shaping parameters can include a binary-bits-to-amplitude-symbols mapping parameter, a distribution parameter for configuring a DM for shaping a constellation for a target probability distribution, and an explicit (e.g., direct) instruction whether to apply probabilistic constellation shaping. In general, the modem may identify any suitable parameter that enables or configures PCS as a parameter sufficient to apply probabilistic constellation shaping.

At block 1506, the device encodes the source information sequence based on a non-systematic type code if the sequence of symbols generated in block 1502 does not have a probabilistic constellation shaping property. On the other hand, at block 1508, the device encodes the source information sequence based on a systematic type code if at least a portion of the sequence of symbols generated in block 1502 has a probabilistic constellation shaping property. In various examples, any suitable error correction coding may be employed for encoding the source information sequence, as described above.

Some implementation examples are described below in the following numbered examples:

Example 1. A method, apparatus, and/or non-transitory computer-readable medium for:
  receiving a source information sequence representing a message for transmission;
  encoding the source information sequence based on a systematic-type code if probabilistic constellation shaping is to be applied;
  encoding the source information sequence based on a non-systematic-type code if probabilistic constellation shaping is not to be applied;
  generating a sequence of symbols representing the message for transmission; and
  transmitting a waveform based on the sequence of symbols.

Example 2. The method, apparatus, and/or non-transitory computer-readable medium of example 1, further for:
  receiving configuration information relating to a modulation scheme or coding scheme;
  encoding the source information sequence based on the systematic-type code if the configuration information comprises an indication relating to probabilistic constellation shaping; and
  encoding the source information sequence based on the non-systematic-type code if the configuration information does not comprise an indication relating to probabilistic constellation shaping, or comprises an explicit indication not to apply probabilistic constellation shaping.

Example 3. The method, apparatus, and/or non-transitory computer-readable medium of either of examples 1-2, wherein the indication relating to probabilistic constellation shaping comprises at least one of:
- an explicit indication to apply or not to apply probabilistic constellation shaping; or
- one or more constellation shaping parameters.

Example 4. The method, apparatus, and/or non-transitory computer-readable medium of any of examples 1-3,
- wherein encoding the source information sequence based on a systematic-type code comprises setting a value of a puncturing parameter to 0, the puncturing parameter relating to puncturing a systematic portion of the message; and
- wherein encoding the source information sequence based on a non-systematic-type code comprises setting the value of the puncturing parameter to a nonzero value.

Example 5. The method, apparatus, and/or non-transitory computer-readable medium of any of examples 1-3,
- wherein encoding the source information sequence based on a systematic-type code comprises utilizing a first base graph, and
- wherein encoding the source information sequence based on a non-systematic-type code comprises utilizing a second base graph, different from the first base graph.

Example 6. A method, apparatus, and/or non-transitory computer-readable medium for:
- generating a set of probabilistically-shaped symbols corresponding to at least a first portion of a source information sequence;
- generating a pre-encoding sequence corresponding to at least a second portion of the source information sequence;
- applying error correction coding to the pre-encoding sequence to generate an encoded sequence comprising a set of systematic bits and a set of parity bits;
- generating a first set of non-probabilistically-shaped symbols corresponding to at least a portion of the set of parity bits;
- replacing a portion of the set of probabilistically-shaped symbols with the set of non-probabilistically shaped symbols to generate an output sequence; and
- modulating a waveform based on the output sequence.

Example 7. The method, apparatus, and/or non-transitory computer-readable medium of example 6, further for:
- generating a binary sequence based on the set of probabilistically-shaped symbols,
- wherein the pre-encoding sequence comprises a concatenation of the second portion of the source information sequence and the binary transformed sequence based on the probabilistically-shaped symbols.

Example 8. The method, apparatus, and/or non-transitory computer-readable medium of either of examples 6-7, wherein the pre-encoding sequence comprises the binary transformed sequence based on the probabilistically-shaped symbols sequentially preceding the second portion of the source information sequence.

Example 9. The method, apparatus, and/or non-transitory computer-readable medium of any of examples 6-8, further for:
- generating a second set of non-probabilistically shaped symbols corresponding to at least a portion of the set of systematic bits; and
- puncturing a subset of symbols of the set of probabilistically-shaped symbols,
- wherein the replacing the portion of the set of probabilistically-shaped symbols further comprises determining that the puncturing applies to no greater than a number of symbols corresponding to the second set of non-probabilistically shaped symbols.

Example 10. A method, apparatus, and/or non-transitory computer-readable medium for:
- receiving a waveform comprising a set of probabilistically-shaped symbols and a set of non-probabilistically shaped symbols;
- demodulating the received waveform to generate a sequence of bits; and
- decoding the sequence of bits by omitting a portion of the bits corresponding to a portion of the set of probabilistically-shaped symbols.

Example 11. A method, apparatus, and/or non-transitory computer-readable medium for:
- generating, based on a source information sequence, a sequence of symbols representing a message for transmission;
- encoding the source information sequence based on a systematic-type code if at least a portion of the generated sequence of symbols has a probabilistic constellation shaping property, or based on a non-systematic-type code if the sequence of symbols does not have the probabilistic constellation shaping property; and
- transmitting a waveform based on the generated sequence of symbols.

Example 12. A method, apparatus, and/or non-transitory computer-readable medium of example 11, further for:
- receiving configuration information relating to a modulation scheme or coding scheme;
- applying probabilistic constellation shaping for encoding the source information sequence if the configuration information comprises an indication relating to probabilistic constellation shaping; and
- encoding the source information sequence without applying probabilistic constellation shaping for if the configuration information does not comprise an indication relating to probabilistic constellation shaping, or comprises an explicit indication not to apply probabilistic constellation shaping.

Example 13. A method, apparatus, and/or non-transitory computer-readable medium of either of examples 11 or 12, further for:
- encoding the source information sequence based on the systematic-type code by setting a value of a puncturing parameter to 0, the puncturing parameter relating to puncturing a systematic portion of the message; and
- encoding the source information sequence based on the non-systematic-type code by setting the value of the puncturing parameter to a nonzero value.

Example 14. A method, apparatus, and/or non-transitory computer-readable medium of either of examples 11 or 12, further for:
- encoding the source information sequence based on the systematic-type code by utilizing a first base graph, and
- encoding the source information sequence based on the non-systematic-type code by utilizing a second base graph, different from the first base graph.

This disclosure presents several aspects of a wireless communication network with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

The present disclosure uses the word "exemplary" to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The present disclosure uses the term "coupled" to refer to a direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The present disclosure uses the terms "circuit" and "circuitry" broadly, to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-14 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-14 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

Applicant provides this description to enable any person skilled in the art to practice the various aspects described herein. Those skilled in the art will readily recognize various modifications to these aspects, and may apply the generic principles defined herein to other aspects. Applicant does not intend the claims to be limited to the aspects shown herein, but to be accorded the full scope consistent with the language of the claims, wherein reference to an element in the singular is not intended to mean "one and only one" unless specifically so stated, but rather "one or more." Unless specifically stated otherwise, the present disclosure uses the term "some" to refer to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communication, comprising:
   receiving a first source information sequence representing a first message for transmission;
   encoding the first source information sequence based on a systematic-type code based on probabilistic constellation shaping being applied, wherein encoding the first source information sequence based on the systematic-type code comprises setting a value of a first puncturing parameter to 0, the first puncturing parameter relating to puncturing a systematic portion of the first message;
   generating a first sequence of symbols representing the first message for transmission; and
   transmitting a first waveform based on the first sequence of symbols.

2. The method of claim 1, further comprising:
   receiving configuration information relating to a modulation scheme or coding scheme; and
   encoding the first source information sequence based on the systematic-type code based on the configuration information comprising an indication relating to probabilistic constellation shaping.

3. The method of claim 2, wherein the indication relating to probabilistic constellation shaping comprises at least one of:
   an explicit indication to apply or not to apply probabilistic constellation shaping; or
   one or more constellation shaping parameters.

4. The method of claim 1,
   receiving a second source information sequence representing a second message for transmission; and
   encoding the second source information sequence based on a non-systematic-type code based on probabilistic constellation shaping not being applied, wherein encoding the second source information sequence based on the non-systematic-type code comprises setting a value of a second puncturing parameter to a nonzero value.

5. The method of claim 4, further comprising:
   receiving configuration information relating to a modulation scheme or coding scheme; and
   encoding the second source information sequence based on the non-systematic-type code based on the configuration information not comprising an indication relating to probabilistic constellation shaping, or comprising an explicit indication not to apply probabilistic constellation shaping.

6. The method of claim 4,
wherein encoding the first source information sequence based on the systematic-type code comprises utilizing a first base graph, and
wherein encoding the second source information sequence based on the non-systematic-type code comprises utilizing a second base graph, different from the first base graph.

7. The method of claim 1, wherein encoding the first source information sequence based on the systematic-type code based on probabilistic constellation shaping being applied comprises encoding the first source information sequence, with a low density parity check (LDPC) encoder, based on the systematic-type code based on probabilistic constellation shaping being applied.

8. A method of wireless communication, comprising:
generating a set of probabilistically-shaped symbols corresponding to at least a first portion of a source information sequence;
generating a pre-encoding sequence corresponding to at least a second portion of the source information sequence;
applying error correction coding to the pre-encoding sequence to generate an encoded sequence comprising a set of systematic bits and a set of parity bits;
generating a first set of non-probabilistically-shaped symbols corresponding to at least a portion of the set of parity bits;
replacing a portion of the set of probabilistically-shaped symbols with the set of non-probabilistically shaped symbols to generate an output sequence; and
modulating a waveform based on the output sequence.

9. The method of claim 8, further comprising:
generating a binary sequence based on the set of probabilistically-shaped symbols,
wherein the pre-encoding sequence comprises a concatenation of the second portion of the source information sequence and the binary sequence based on the probabilistically-shaped symbols.

10. The method of claim 9, wherein the pre-encoding sequence comprises the binary sequence based on the probabilistically-shaped symbols sequentially preceding the second portion of the source information sequence.

11. The method of claim 8, further comprising:
generating a second set of non-probabilistically shaped symbols corresponding to at least a portion of the set of systematic bits; and
puncturing a subset of symbols of the set of probabilistically-shaped symbols,
wherein the replacing the portion of the set of probabilistically-shaped symbols further comprises determining that the puncturing applies to no greater than a number of symbols corresponding to the second set of non-probabilistically shaped symbols.

12. A wireless communication apparatus, comprising:
at least one processor;
at least one memory communicatively coupled to the at least one processor; and
a transceiver communicatively coupled to the at least one processor,
wherein the at least one processor is configured to cause the wireless communication apparatus to:
receive a first source information sequence representing a first message for transmission;
encode the first source information sequence based on a systematic-type code based on probabilistic constellation shaping being applied, wherein to encode the first source information sequence based on the systematic-type code, the at least one processor is further configured to cause the wireless communication apparatus to set a value of a first puncturing parameter to 0, the first puncturing parameter relating to puncturing a systematic portion of the first message;
generate a first sequence of symbols representing the first message for transmission; and
transmit, via the transceiver, a first waveform based on the first sequence of symbols.

13. The wireless communication apparatus of claim 12, wherein the at least one processor is further configured to cause the wireless communication apparatus to:
receive, via the transceiver, configuration information relating to a modulation scheme or coding scheme; and
encode the first source information sequence based on the systematic-type code based on the configuration information comprising an indication relating to probabilistic constellation shaping.

14. The wireless communication apparatus of claim 13, wherein the indication relating to probabilistic constellation shaping comprises at least one of:
an explicit indication to apply or not to apply probabilistic constellation shaping; or
one or more constellation shaping parameters.

15. The wireless communication apparatus of claim 12, wherein the at least one processor is further configured to cause the wireless communication apparatus to receive a second source information sequence representing a second message for transmission; and
encode the second source information sequence based on a non-systematic-type code based on probabilistic constellation shaping not being applied, wherein to encode the second source information sequence based on the non-systematic-type code, the at least one processor is further configured to cause the wireless communication apparatus to set a value of a second puncturing parameter to a nonzero value.

16. The wireless communication apparatus of claim 15, wherein the at least one processor is configured to cause the wireless communication apparatus to:
receive configuration information relating to a modulation scheme or coding scheme; and
encode the second source information sequence based on the non-systematic-type code based on the configuration information not comprising an indication relating to probabilistic constellation shaping, or comprising an explicit indication not to apply probabilistic constellation shaping.

17. The wireless communication apparatus of claim 15,
wherein to encode the first source information sequence based on the systematic-type code, the at least one processor is further configured to cause the wireless communication apparatus to utilize a first base graph, and
wherein to encode the second source information sequence based on the non-systematic-type code, the at least one processor is further configured to cause the wireless communication apparatus to utilize a second base graph, different from the first base graph.

18. The wireless communication apparatus of claim 12, wherein to encode the first source information sequence based on the systematic-type code based on probabilistic constellation shaping being applied, the at least one processor is configured to cause the wireless communication apparatus to encode the first source information sequence, with a low density parity check (LDPC) encoder, based on the systematic-type code based on probabilistic constellation shaping being applied.

19. A wireless communication apparatus, comprising:
at least one processor;
at least one memory communicatively coupled to the at least one processor; and
a transceiver communicatively coupled to the at least one processor,
wherein the at least one processor is configured to cause the wireless communication apparatus to:
generate a set of probabilistically-shaped symbols corresponding to at least a first portion of a source information sequence;
generate a pre-encoding sequence corresponding to at least a second portion of the source information sequence;
apply error correction coding to the pre-encoding sequence to generate an encoded sequence comprising a set of systematic bits and a set of parity bits;
generate a first set of non-probabilistically-shaped symbols corresponding to at least a portion of the set of parity bits;
replace a portion of the set of probabilistically-shaped symbols with the set of non-probabilistically shaped symbols to generate an output sequence; and
modulate, via the transceiver, a waveform based on the output sequence.

20. The wireless communication apparatus of claim 19, wherein the at least one processor is further configured to cause the wireless communication apparatus to:
generate a binary sequence based on the set of probabilistically-shaped symbols,
wherein the pre-encoding sequence comprises a concatenation of the second portion of the source information sequence and the binary sequence based on the probabilistically-shaped symbols.

21. The wireless communication apparatus of claim 20, wherein the pre-encoding sequence comprises the binary sequence based on the probabilistically-shaped symbols sequentially preceding the second portion of the source information sequence.

22. The wireless communication apparatus of claim 19, wherein the at least one processor is further configured to cause the wireless communication apparatus to:
generate a second set of non-probabilistically shaped symbols corresponding to at least a portion of the set of systematic bits; and
puncture a subset of symbols of the set of probabilistically-shaped symbols,
wherein to replace the portion of the set of probabilistically-shaped symbols, the at least one processor is further configured to cause the wireless communication apparatus to determine that the puncturing applies to no greater than a number of symbols corresponding to the second set of non-probabilistically shaped symbols.

* * * * *